United States Patent
Welch et al.

(10) Patent No.: US 9,317,147 B2
(45) Date of Patent: Apr. 19, 2016

(54) INPUT TESTING TOOL

(71) Applicant: Microsoft Corporation, Redmond, WA (US)

(72) Inventors: Steven Andrew Welch, Seattle, WA (US); Takahiro Shigemitsu, Bellevue, WA (US); Timothy Allen Wright, Redmond, WA (US); Mark D. Vance, Sammamish, WA (US); Steven E. Wittenberg, Snohomish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 338 days.

(21) Appl. No.: 13/659,777

(22) Filed: Oct. 24, 2012

(65) Prior Publication Data

US 2014/0111484 A1   Apr. 24, 2014

(51) Int. Cl.
*G06F 3/041* (2006.01)
*H04N 17/00* (2006.01)

(52) U.S. Cl.
CPC ............... *G06F 3/041* (2013.01); *H04N 17/00* (2013.01)

(58) Field of Classification Search
CPC ........................................ G06F 3/041
USPC ........................................ 345/178
See application file for complete search history.

(56) References Cited

U.S. PATENT DOCUMENTS

| | | | |
|---|---|---|---|
| 4,890,241 A | 12/1989 | Hoffman et al. | |
| 5,825,352 A | 10/1998 | Bisset et al. | |
| 5,825,666 A * | 10/1998 | Freifeld | 702/153 |
| 5,856,822 A | 1/1999 | Du et al. | |
| 5,943,043 A | 8/1999 | Furuhata et al. | |
| 6,008,636 A | 12/1999 | Miller et al. | |
| 6,021,495 A | 2/2000 | Jain et al. | |
| 6,091,406 A | 7/2000 | Kambara et al. | |
| 6,323,846 B1 | 11/2001 | Westerman et al. | |
| 6,360,254 B1 | 3/2002 | Linden et al. | |
| 6,377,936 B1 | 4/2002 | Henrick et al. | |

(Continued)

FOREIGN PATENT DOCUMENTS

| CN | 201828476 | 5/2011 |
|---|---|---|
| CN | 2201903594 | 7/2011 |

(Continued)

OTHER PUBLICATIONS

"Capacitive Touch Sensors—Application Fields, Technology Overview and Implementation Example", Fujitsu Microelectronics Europe GmbH; retrieved from http://www.fujitsu.com/downloads/MICRO/fme/articles/fujitsu-whitepaper-capacitive-touch-sensors.pdf on Jul. 20, 2011, Jan. 12, 2010, 12 pages.

(Continued)

*Primary Examiner* — Jason Olson
(74) *Attorney, Agent, or Firm* — Tim Churna; Kate Drakos; Micky Minhas

(57) ABSTRACT

Various embodiments provide an input test tool that promotes precision testing, flexibility and repeatability over a wide variety of functionality tests that are utilized in both touch and near-touch input scenarios. The input test tool enables a variety of degrees of motion, including both linear and rotational motion, so that a device under test can be tested utilizing a number of different linear and/or rotational input scenarios.

20 Claims, 14 Drawing Sheets

(56) References Cited

U.S. PATENT DOCUMENTS

| | | |
|---|---|---|
| 6,671,406 B1 | 12/2003 | Anderson |
| 6,741,237 B1 | 5/2004 | Benard et al. |
| 6,856,259 B1 | 2/2005 | Sharp |
| 6,959,362 B2 | 10/2005 | Wall et al. |
| 6,977,646 B1 | 12/2005 | Hauck et al. |
| 7,039,871 B2 | 5/2006 | Cronk |
| 7,053,887 B2 | 5/2006 | Kraus et al. |
| 7,254,775 B2 | 8/2007 | Geaghan et al. |
| 7,295,191 B2 | 11/2007 | Kraus et al. |
| 7,362,313 B2 | 4/2008 | Geaghan et al. |
| 7,375,454 B2 | 5/2008 | Takasaki |
| 7,489,303 B1 | 2/2009 | Pryor |
| 7,536,386 B2 | 5/2009 | Samji et al. |
| 7,580,556 B2 | 8/2009 | Lee et al. |
| 7,619,618 B2 | 11/2009 | Westerman et al. |
| 7,711,450 B2 | 5/2010 | Im et al. |
| 7,728,821 B2 | 6/2010 | Hillis et al. |
| 7,746,325 B2 | 6/2010 | Roberts |
| 7,797,115 B2 | 9/2010 | Tasher et al. |
| 7,812,828 B2 | 10/2010 | Westerman et al. |
| 7,907,750 B2 | 3/2011 | Ariyur et al. |
| 7,938,009 B2 | 5/2011 | Grant et al. |
| 7,978,182 B2 | 7/2011 | Ording et al. |
| 8,061,223 B2 | 11/2011 | Pan |
| 8,217,909 B2 | 7/2012 | Young |
| 8,311,513 B1 | 11/2012 | Nasserbakht et al. |
| 8,314,780 B2 | 11/2012 | Lin et al. |
| 8,493,355 B2 | 7/2013 | Geaghan et al. |
| 2002/0147929 A1 | 10/2002 | Rose |
| 2002/0153877 A1* | 10/2002 | Harris et al. ............... 324/158.1 |
| 2003/0061520 A1 | 3/2003 | Zellers et al. |
| 2003/0164820 A1 | 9/2003 | Kent |
| 2003/0200465 A1 | 10/2003 | Bhat et al. |
| 2004/0207606 A1 | 10/2004 | Atwood et al. |
| 2005/0012724 A1 | 1/2005 | Kent |
| 2005/0063566 A1 | 3/2005 | Beek et al. |
| 2005/0086296 A1 | 4/2005 | Chi et al. |
| 2005/0195978 A1 | 9/2005 | Babic et al. |
| 2005/0277323 A1 | 12/2005 | Eldridge et al. |
| 2006/0097991 A1 | 5/2006 | Hotelling et al. |
| 2006/0175485 A1 | 8/2006 | Cramer |
| 2006/0227120 A1 | 10/2006 | Eikman |
| 2006/0235803 A1 | 10/2006 | Romney |
| 2006/0259957 A1 | 11/2006 | Tam et al. |
| 2007/0081726 A1 | 4/2007 | Westerman et al. |
| 2008/0013064 A1 | 1/2008 | Nishii |
| 2008/0041639 A1 | 2/2008 | Westerman et al. |
| 2008/0062140 A1 | 3/2008 | Hotelling et al. |
| 2008/0068229 A1 | 3/2008 | Chuang |
| 2008/0109912 A1 | 5/2008 | Rivera |
| 2008/0134343 A1 | 6/2008 | Pennington et al. |
| 2008/0150909 A1 | 6/2008 | North et al. |
| 2008/0158185 A1 | 7/2008 | Westerman |
| 2008/0180399 A1 | 7/2008 | Cheng |
| 2008/0209329 A1 | 8/2008 | DeFranco et al. |
| 2008/0211778 A1 | 9/2008 | Ording et al. |
| 2008/0211782 A1 | 9/2008 | Geaghan et al. |
| 2008/0252616 A1 | 10/2008 | Chen |
| 2008/0278453 A1 | 11/2008 | Reynolds et al. |
| 2008/0284899 A1 | 11/2008 | Haubmann et al. |
| 2008/0309624 A1 | 12/2008 | Hotelling |
| 2008/0309629 A1 | 12/2008 | Westerman et al. |
| 2009/0009483 A1 | 1/2009 | Hotelling et al. |
| 2009/0046073 A1 | 2/2009 | Pennington et al. |
| 2009/0096753 A1 | 4/2009 | Lim |
| 2009/0141046 A1 | 6/2009 | Rathnam et al. |
| 2009/0157206 A1 | 6/2009 | Weinberg et al. |
| 2009/0160763 A1 | 6/2009 | Cauwels et al. |
| 2009/0174679 A1 | 7/2009 | Westerman |
| 2009/0234876 A1 | 9/2009 | Schigel et al. |
| 2009/0241701 A1 | 10/2009 | Pan |
| 2009/0250268 A1 | 10/2009 | Staton et al. |
| 2009/0251435 A1 | 10/2009 | Westerman et al. |
| 2009/0267903 A1 | 10/2009 | Cady et al. |
| 2009/0273584 A1 | 11/2009 | Staton et al. |
| 2009/0300020 A1 | 12/2009 | Chen et al. |
| 2009/0303202 A1 | 12/2009 | Liu et al. |
| 2009/0312009 A1 | 12/2009 | Fishel |
| 2010/0042682 A1 | 2/2010 | Kaye |
| 2010/0053099 A1 | 3/2010 | Vincent et al. |
| 2010/0073318 A1 | 3/2010 | Hu et al. |
| 2010/0088372 A1 | 4/2010 | Shridhar et al. |
| 2010/0103118 A1 | 4/2010 | Townsend et al. |
| 2010/0103121 A1 | 4/2010 | Kim et al. |
| 2010/0121657 A1 | 5/2010 | Rosenberger et al. |
| 2010/0134429 A1 | 6/2010 | You et al. |
| 2010/0192211 A1 | 7/2010 | Bono et al. |
| 2010/0193258 A1 | 8/2010 | Simmons et al. |
| 2010/0214233 A1 | 8/2010 | Lee |
| 2010/0241711 A1 | 9/2010 | Ansari et al. |
| 2010/0266993 A1 | 10/2010 | Gregoire et al. |
| 2010/0277505 A1 | 11/2010 | Ludden et al. |
| 2010/0302211 A1 | 12/2010 | Huang |
| 2010/0309139 A1 | 12/2010 | Ng |
| 2010/0315266 A1 | 12/2010 | Gunawardana et al. |
| 2010/0315366 A1 | 12/2010 | Lee et al. |
| 2010/0315372 A1 | 12/2010 | Ng |
| 2011/0018822 A1 | 1/2011 | Lin et al. |
| 2011/0022414 A1 | 1/2011 | Ge et al. |
| 2011/0025629 A1 | 2/2011 | Grivna et al. |
| 2011/0042126 A1 | 2/2011 | Spaid et al. |
| 2011/0047590 A1 | 2/2011 | Carr et al. |
| 2011/0050620 A1 | 3/2011 | Hristov |
| 2011/0055062 A1 | 3/2011 | Junttila et al. |
| 2011/0055912 A1 | 3/2011 | Fusari et al. |
| 2011/0080348 A1 | 4/2011 | Lin et al. |
| 2011/0084929 A1 | 4/2011 | Chang et al. |
| 2011/0106477 A1 | 5/2011 | Brunner |
| 2011/0122072 A1 | 5/2011 | Lin et al. |
| 2011/0126280 A1 | 5/2011 | Asano |
| 2011/0141054 A1 | 6/2011 | Wu |
| 2011/0173547 A1 | 7/2011 | Lewis et al. |
| 2011/0214148 A1 | 9/2011 | Gossweiler, III et al. |
| 2011/0261005 A1 | 10/2011 | Joharapurkar et al. |
| 2011/0267481 A1 | 11/2011 | Kagei |
| 2011/0289143 A1 | 11/2011 | Polis et al. |
| 2011/0298709 A1 | 12/2011 | Vaganov |
| 2011/0298745 A1 | 12/2011 | Souchkov |
| 2011/0299734 A1 | 12/2011 | Bodenmueller |
| 2011/0304577 A1 | 12/2011 | Brown |
| 2011/0304590 A1 | 12/2011 | Su et al. |
| 2011/0320380 A1 | 12/2011 | Zahn |
| 2012/0030624 A1 | 2/2012 | Migos |
| 2012/0032891 A1 | 2/2012 | Parivar |
| 2012/0044194 A1 | 2/2012 | Peng et al. |
| 2012/0065779 A1 | 3/2012 | Yamaguchi et al. |
| 2012/0065780 A1 | 3/2012 | Yamaguchi et al. |
| 2012/0075331 A1 | 3/2012 | Mallick |
| 2012/0105334 A1 | 5/2012 | Aumiller et al. |
| 2012/0117156 A1 | 5/2012 | Anka |
| 2012/0124615 A1 | 5/2012 | Lee |
| 2012/0131490 A1 | 5/2012 | Lin et al. |
| 2012/0146956 A1 | 6/2012 | Jenkinson |
| 2012/0153652 A1 | 6/2012 | Yamaguchi et al. |
| 2012/0185933 A1 | 7/2012 | Belk et al. |
| 2012/0187956 A1 | 7/2012 | Uzelac |
| 2012/0188176 A1 | 7/2012 | Uzelac |
| 2012/0188197 A1 | 7/2012 | Uzelac |
| 2012/0191394 A1 | 7/2012 | Uzelac |
| 2012/0206377 A1 | 8/2012 | Zhao |
| 2012/0206380 A1 | 8/2012 | Zhao |
| 2012/0223894 A1 | 9/2012 | Zhao |
| 2012/0259773 A1 | 10/2012 | Hoffman |
| 2012/0260158 A1 | 10/2012 | Steelberg |
| 2012/0265841 A1 | 10/2012 | Ross et al. |
| 2012/0268416 A1 | 10/2012 | Pirogov et al. |
| 2012/0280934 A1* | 11/2012 | Ha et al. ...................... 345/174 |
| 2012/0280946 A1 | 11/2012 | Shih et al. |
| 2012/0317208 A1 | 12/2012 | Sousa et al. |
| 2012/0319992 A1 | 12/2012 | Lee |
| 2012/0331108 A1 | 12/2012 | Ferdowsi et al. |
| 2013/0016045 A1 | 1/2013 | Zhao |
| 2013/0063167 A1 | 3/2013 | Jonsson |
| 2013/0066975 A1 | 3/2013 | Kantor et al. |

(56) References Cited

U.S. PATENT DOCUMENTS

| | | | |
|---|---|---|---|
| 2013/0067303 A1 | 3/2013 | Kantor | |
| 2013/0067594 A1 | 3/2013 | Kantor | |
| 2013/0113751 A1 | 5/2013 | Uzelac | |
| 2013/0197862 A1 | 8/2013 | Uzelac et al. | |
| 2013/0238129 A1 | 9/2013 | Rose et al. | |
| 2013/0278539 A1 | 10/2013 | Valentine et al. | |
| 2013/0278550 A1 | 10/2013 | Westhues | |
| 2013/0345864 A1 | 12/2013 | Park | |
| 2014/0111485 A1 | 4/2014 | Welch et al. | |
| 2014/0354310 A1 | 12/2014 | Hargrove et al. | |

FOREIGN PATENT DOCUMENTS

| | | |
|---|---|---|
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2284654 | 2/2011 |
| JP | 2003303051 | 10/2003 |
| KR | 20010019445 | 3/2001 |
| KR | 20050003155 | 1/2005 |
| KR | 20050094359 | 9/2005 |
| KR | 20070007963 | 1/2007 |
| KR | 100763057 | 10/2007 |
| KR | 20080019949 | 3/2008 |
| KR | 20080066416 | 7/2008 |
| KR | 100941441 | 2/2010 |
| KR | 20100067178 | 6/2010 |
| KR | 20100077298 | 7/2010 |
| KR | 20100129015 | 12/2010 |
| KR | 20100135982 | 12/2010 |
| KR | 101007049 | 1/2011 |
| KR | 20110005946 | 1/2011 |
| KR | 20110011337 | 2/2011 |
| KR | 20110016349 | 2/2011 |
| KR | 101065014 | 9/2011 |
| WO | WO-2006042309 | 4/2006 |
| WO | WO-20130063042 | 5/2013 |

OTHER PUBLICATIONS

"Final Office Action", U.S. Appl. No. 12/941,693, Nov. 18, 2013, 21 Pages.

"Final Office Action", U.S. Appl. No. 12/941,693, Nov. 26, 2012, 22 Pages.

"Final Office Action", U.S. Appl. No. 13/152,991, Sep. 20, 2013, 14 pages.

"Final Office Action", U.S. Appl. No. 13/183,377, Oct. 15, 2013, 12 pages.

"Final Office Action", U.S. Appl. No. 13/229,121, Nov. 21, 2013, 15 pages.

"Final Office Action", U.S. Appl. No. 13/229,214, Jul. 26, 2013, 25 pages.

"Final Office Action", U.S. Appl. No. 13/293,060, Sep. 25, 2013, 10 pages.

"Haptic-Actuator Controllers", retrieved from <http://www.maxim-ic.com/products/data_converters/touch-interface/haptic-actuator.cfm> on May 4, 2011, 1 page.

"International Search Report and Written Opinion", Application No. PCT/US2013/053621, Feb. 20, 2013, 10 pages.

"International Search Report and Written Opinion", Application No. PCT/US2012/053681, Feb. 27, 2013, 11 pages.

"International Search Report and Written Opinion", Application No. PCT/US2013/061067, Feb. 7, 2014, 11 pages.

"International Search Report and Written Opinion", Application No. PCT/US2011/055621, Jun. 13, 2012, 8 pages.

"International Search Report and Written Opinion", Application No. PCT/US2013/021787, May 13, 2013, 9 pages.

"International Search Report and Written Opinion", Application No. PCT/US2012/024780, Sep. 3, 2012, 9 pages.

"International Search Report and Written Opinion", Application No. PCT/US2012/024781, Sep. 3, 2012, 9 pages.

"International Search Report and Written Opinion", Application No. PCT/US2012/027642, Sep. 3, 2012, 9 pages.

"International Search Report", Application No. PCT/US2011/058855, Nov. 1, 2011, 8 pages.

"MAX11871", retrieved from <http://www.maxim-ic.com/datasheet/index.mvp/id/7203> on May 4, 2011, Mar. 25, 2011, 2 pages.

"MOSS User Permissions and 'Modify Shared Webpart' Link", retrieved from http://www.sharepointdev.net/sharepoint-general-question-answers-discussion/moss-user-permissions-modify-shared-webpart-link-13744.shtml on Aug. 8, 2011, 2009, 3 pages.

"Non-Final Office Action", U.S. Appl. No. 12/941,693, May 16, 2013, 13 pages.

"Non-Final Office Action", U.S. Appl. No. 12/941,693, Jul. 18, 2012, 19 pages.

"Non-Final Office Action", U.S. Appl. No. 13/099,288, Feb. 6, 2014, 13 pages.

"Non-Final Office Action", U.S. Appl. No. 13/152,991, Mar. 21, 2014, 18 pages.

"Non-Final Office Action", U.S. Appl. No. 13/152,991, Mar. 21, 2013, 10 pages.

"Non-Final Office Action", U.S. Appl. No. 13/154,161, Jan. 3, 2014, 14 pages.

"Non-Final Office Action", U.S. Appl. No. 13/156,243, Sep. 19, 2013, 12 pages.

"Non-Final Office Action", U.S. Appl. No. 13/183,377, Feb. 27, 2014, 12 pages.

"Non-Final Office Action", U.S. Appl. No. 13/183,377, Jun. 21, 2013, 10 pages.

"Non-Final Office Action", U.S. Appl. No. 13/198,036, Jan. 31, 2014, 14 pages.

"Non-Final Office Action", U.S. Appl. No. 13/228,283, Aug. 27, 2013, 12 pages.

"Non-Final Office Action", U.S. Appl. No. 13/229,121, Jun. 7, 2013, 13 pages.

"Non-Final Office Action", U.S. Appl. No. 13/229,214, Feb. 15, 2013, 23 pages.

"Non-Final Office Action", U.S. Appl. No. 13/293,060, Nov. 29, 2013, 11 pages.

"Non-Final Office Action", U.S. Appl. No. 13/293,060, Jul. 12, 2013, 9 pages.

"Non-Final Office Action", U.S. Appl. No. 13/530,692, Jan. 31, 2014, 14 pages.

"Notice of Allowance", U.S. Appl. No. 13/156,243, Jan. 28, 2014, 8 pages.

"Notice of Allowance", U.S. Appl. No. 13/198,415, Dec. 26, 2013, 8 pages.

"Office Web Apps: Share a SkyDriver Folder", retrieved from http://explore.live.com/office-web-apps-skydrive-share-using on Aug. 8, 2011, 2 pages.

"Office Web Apps: Share files on SkyDrive", retrieved from http://explore.live.com/office-web-apps-skydrive-share-files-using on Aug. 8, 2011, 1 page.

"Public or Private Articles", retrieved from <http://www.presspublisher.com/features/public-or-private-articles> on Aug. 8, 2011, 3 pages.

"Setting Sharing Permissions for Google Docs and Google Sites", retrieved from http://www.library.kent.edu/files/SMS_Google_Sharing_Permissions.pdf on Aug. 8, 2011, 8 pages.

"Share Office documents in SkyDrive", retrieved from http://office.microsoft.com/en-us/web-apps-help/share-office-documents-in-skydrive-HA101820121.aspx on Aug. 8, 2011, 3 pages.

"Shared Folder Permissions", retrieved from http://www.tech-faq.com/shared-folder-permissions.html on Aug. 8, 2011, 7 pages.

"STM23S-2AN NEMA 23 Integrated Drive+Motor", Retrieved from: <http://www.applied-motion.com/products/integrated-steppers/stm23s-2an> on Jan. 24, 2012, Jan. 24, 2010, 3 pages.

(56) References Cited

OTHER PUBLICATIONS

"Technology Comparison: Surface Acoustic Wave, Optical and Bending Wave Technology", 3M Touch Systems, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,2009, pp. 1-4.

"Using Low Power Mode on the MPR083 and MPR084", Freescale Semiconductor Application Note, Available at <http://cache.freescale.com/files/sensors/doc/app_note/AN3583.pdf>,Nov. 2007, pp. 1-5.

Asif, et al.,' "MPEG-7 Motion Descriptor Extraction for Panning Camera Using Sprite Generated", In Proceedings of AVSS 2008, Available at <http://ieeexplore.ieee.org/stamp/stamp.jsp?tp=&arnumber=4730384>,Sep. 2008, pp. 60-66.

Baraldi, et al.,' "WikiTable: Finger Driven Interaction for Collaborative Knowledge-Building Workspaces", Proceedings of the 2006 Conference on Computer Vision and Pattern Recognition Workshop (CVPRW '06), available at <<http://ieeexplore.ieee.org/stamp/stamp.jsp?tp=&arnumber=1640590>>,Jul. 5, 2006, 6 pages.

Benko, et al.,' "Resolving Merged Touch Contacts", U.S. Appl. No. 12/914,693, Nov. 8, 2010, 22 pages.

Binns, "Multi-"Touch" Interaction via Visual Tracking", Bachelor of Science in Computer Science with Honours, The University of Bath, available at <<http://www.cs.bath.ac.uk/~mdv/courses/CM30082/projects.bho/2008-9/Binns-FS-dissertation-2008-9.pdf>>,May 2009, 81 pages.

Cao, et al.,' "Evaluation of an On-line Adaptive Gesture Interface with Command Prediction", In Proceedings of GI 2005, Available at <http://citeseerx.ist.psu.edu/viewdoc/download;jsessionid=DAB1B08F620C23464427932BAF1ECF49?doi=10.1.1.61.6749&rep=rep1&type=pdf>,May 2005, 8 pages.

Cao, et al.,' "ShapeTouch: Leveraging Contact Shape on Interactive Surfaces", In Proceedings of Tabletop 2008, Available at <http://www.cs.toronto.edu/~caox/tabletop2008_shapetouch.pdf>,2008, pp. 139-146.

Cravotta, "The Battle for Multi-touch", Embedded Insights, retrieved from <http://www.embeddedinsights.com/channels/2011/04/12/the-battle-for-multi-touch/> on May 4, 2011,Apr. 12, 2011, 3 pages.

Dang, et al.,' "Hand Distinction for Multi-Touch Tabletop Interaction", University of Augsburg; Institute of Computer Science; Proceedings of the ACM International Conference on Interactive Tabletops and Surfaces, Nov. 23-25, 2009, 8 pages.

Dillencourt, et al.,' "A General Approach to Connected-Component Labeling for Arbitrary Image Representations", Journal of the Association for Computing Machinery, vol. 39, No. 2, available at <<http://www.cs.umd.edu/~hjs/pubs/DillJACM92.pdf>>,Apr. 1992, pp. 253-280.

Li, et al.,' "Role Based Access Control for Social Network Sites", Department of Computer Science, Sun Yat-sen University; retrieved from http://ieeexplore.ieee.org/stamp/stamp.jsp?arnumber=05420153, Dec. 3-5, 2009, 6 pages.

Pratt, "Factors Affecting Sensor Response", Analog Devices, AN-830 Application Note, Available at <http://www.analog.com/static/imported-files/application_notes/5295737729138218742AN830_0.pdf>,Dec. 2005, pp. 1-8.

Tao, et al.,' "An Efficient Cost Model for Optimization of Nearest Neighbor Search in Low and Medium Dimensional Spaces", Knowledge and Data Engineering, vol. 16 Issue:10, retrieved from <<http://www.cais.ntu.edu.sg/~jzhang/papers/ecmonns.pdf>> on Mar. 16, 2011,Oct. 2004, 16 pages.

Tsuchiya, et al.,' "Vib-Touch: Virtual Active Touch Interface for Handheld Devices", In Proceedings of The 18th IEEE International Symposium on Robot and Human Interactive Communication, Available at <http://www.mech.nagoya-u.ac.jp/asi/en/member/shogo_okamoto/papers/tsuchiyaROMAN2009.pdf>,Oct. 2009, pp. 12-17.

Westman, et al.,' "Color Segmentation by Hierarchical Connected Components Analysis with Image Enhancement by Symmetric Neighborhood Filter", Pattern Recognition, 1990. Proceedings., 10th International Conference on Jun. 16-21, 1990, retrieved from <<http://ieeexplore.ieee.org/stamp/stamp.jsp?tp=&arnumber=118219>> on Mar. 16, 2011,Jun. 16, 1990, pp. 796-802.

Wilson, "TouchLight: An Imaging Touch Screen and Display for Gesture-Based Interaction", In Proceedings of ICIM 2004, Available at <http://citeseerx.ist.psu.edu/viewdoc/download?doi=10.1.1.95.3647&rep=rep1&type=pdf>, Oct. 2004, 8 pages.

Wimmer, et al.,' "Modular and Deformable Touch-Sensitive Surfaces Based on Time Domain Reflectometry", In Proceedings of UIST 2011, Available at <http://www.medien.ifi.Imu.de/pubdb/publications/pub/wimmer2011tdrTouch/wimmer2011tdrTouch.pdf>,Oct. 2011, 10 pages.

"Non-Final Office Action", U.S. Appl. No. 13/664,840, Jul. 15, 2014, 14 pages.

"Final Office Action", U.S. Appl. No. 13/530,692, Apr. 10, 2014, 16 pages.

Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>>, (Sep. 13, 2011), 1 Page.

Buffet, Y "Robot Touchscreen Analysis", <<http://ybuffet.posterous.com/labsmotocom-blog-archive-robot-touchscreen-an>>, (Apr. 19, 2010), 2 Pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", 22nd International Conference on Field Programmable Logic and Applications, Available at <https://www2.lirmm.fr/lirmm/interne/BIBLI/CDROM/MIC/2012/FPL_2012/Papers/PHD7.pdf>,(Aug. 29, 2012), 2 pages.

Kastelan, et al., "Touch-Screen Stimulation for Automated Verification of Touchscreen-Based Devices", In IEEE 19th International Conference and Workshops on Engineering of Computer Based Systems, (Apr. 11, 2012), pp. 52-55.

Kjellgren, Olof "Developing a remote control application for Windows CE", Bachelor Thesis performed in Computer Engineering at ABE Robotics, Miilardalen University, Department of Computer Science and Electronics, Retrieved at <<http://www.idt.mdh.se/utbildning/exjobblfiles/TR0661.pdf>>,(May 30, 2007), 43 Pages.

McGlaun, Shane "Microsoft's Surface 2.0 Stress Testing Robot Called Patty Shown off for First Time", Retrieved at <<http://www.slashgear.com/microsofts-surface-2 -0-stress-testing-robot -called-patty-shown-off -for -first-time-19172971/>>, (Aug. 19, 2011), 1 Page.

Takeuchi, et al., "Development of a Muti-fingered Robot Hand with Softness changeable Skin Mechanism", International Symposium on and 2010 6th German Conference on Robotics (ROBOTIK), Retrieved at <<http://ieeexplore.ieee.org/stamp/stamp.jsp?arnumber=05756853>>, (Jun. 7, 2010), 7 Pages.

Zivkov, et al., "Touch Screen Mobile Application as Part of Testing and Verification System", Proceedings of the 35th International Convention, (May 21, 2012), pp. 892-895.

"Touch Quality Test Robot", U.S. Appl. No. 13/530,692, (Jun. 22, 2012), 20 pages.

"Actuation Force of Touch Screen", *Solutions @ Mecmesin*, retrieved from <http://www.ArticleOnePartners.com/index/servefile?fileId=188971>,(Dec. 31, 2010), 1 page.

"AO Touch Screen Tester", retrieved from <http://www.ao-cs.com/Projects/touch%20screen%20tester%20project.html>, (Dec. 31, 2010), 1 page.

"Linearity Testing Solutions in Touch Panels", retrieved from <advantech.com/machine-automation/.../%7BD05BC586-74DD-4BFA-B81A-2A9F7ED489F/>, (Nov. 15, 2011), 2 pages.

"MicroNav Integration Guide Version 3.0", retrieved from <http://www.steadlands.com/data/interlink/micronavintguide.pdf>, (Dec. 31, 2003), 11 pages.

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.

"OptoFidelity Touch & Test", retrieved from <http://www.ArticleOnePartners.com/index/servefile?fileId=188969, (Feb. 20, 2012), 2 pages.

(56) References Cited

OTHER PUBLICATIONS

"OptoFidelity Touch and Test", retrieved from <http://www.ArticleOnePartners.com/index/servefile?fileId=188420>, (May 4, 2012), 2 pages.

"OptoFidelity Two Fingers—robot", video available at <http://www.youtube.com/watch?v=YppRASbXHfk&feature=player_embedded#!section>, (Sep. 15, 2010), 2 pages.

"Project Capacitive Test Fixture", retrieved from <http://www.touch-intl.com/downloads/DataSheets%20for%20Web/6500443-PCT-DataSheet-Web.pdf>, (2009), 2 pages.

"Resistive Touch Screen_Resistance Linearity Test", video available at <http://www.youtube.com/watch?v=hb23GpQdXXU>, (Jun. 17, 2008), 2 pages.

"Smartphone Automatic Testing Robot at UEI Booth", video available at <http://www.youtube.com/watch?v=f-Q4ns-b9sA>, (May 9, 2012), 2 pages.

"Touch Panel Inspection & Testing Solution", retrieved from <http://www.ArticleOnePartners.com/index/servefile?fileId=188967>, (Dec. 31, 2010), 1 page.

"Touch Panel Semi-Auto Handler Model 3810", retrieved from <http://www.chromaus.com/datasheet/3810_en.pdf>, (Dec. 31, 2010), 2 pages.

"TouchSense Systems Immersion", retrieved from <http://www.ArticleOnePartners.com/index/servefile?fileId=188486>, (Jun. 19, 2010), 20 pages.

Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 3 pages.

Khandkar, Shahedul H., et al., "Tool Support for Testing Complex MultiTouch Gestures", ITS 2010, Nov. 7-10, 2010, Saarbrucken, Germany, (Nov. 7, 2010), 10 pages.

Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.

Levin, Michael et al., "Tactile-Feedback Solutions for an Enhanced User Experience", retrieved from>http://www.pbinterfaces.com/documents/Tactile_Feedback_Solutions.pdf>, (Oct. 31, 2009), pp. 18-21.

McMahan, William et al., "Haptic Display of Realistic Tool Contact via Dynamically Compensated Control of a Dedicated Actuator", International Conference on Intelligent Robots and Systems, St. Louis, MO, Oct. 11-15, 2009, retrieved from <http://repository.upenn.edu/meam_papers/222>, (Dec. 15, 2009), 9 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

"PCT Search Report and Written Opinion", Application No. PCT/US2013/046208, Sep. 27, 2013, 12 pages.

"Non-Final Office Action", U.S. Appl. No. 13/530,692, Aug. 25, 2014, 18 pages.

"Non-Final Office Action Issued in U.S. Appl. No. 13/664,840", Mailed Date: Sep. 18, 2015, 17 Pages.

"Corrected Notice of Allowance", U.S. Appl. No. 13/530,692, Apr. 23, 2015, 4 pages.

"Final Office Action", U.S. Appl. No. 13/664,840, Mar. 27, 2015, 15 pages.

"Non-Final Office Action", U.S. Appl. No. 13/905,093, Feb. 20, 2015, 18 pages.

"Notice of Allowance", U.S. Appl. No. 13/530,692, Mar. 3, 2015, 8 pages.

\* cited by examiner

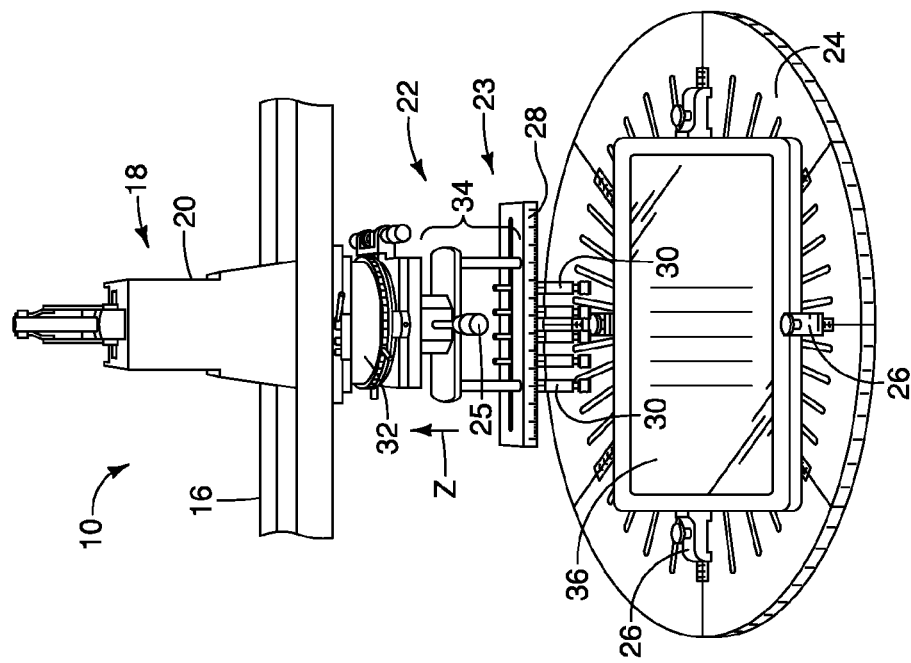
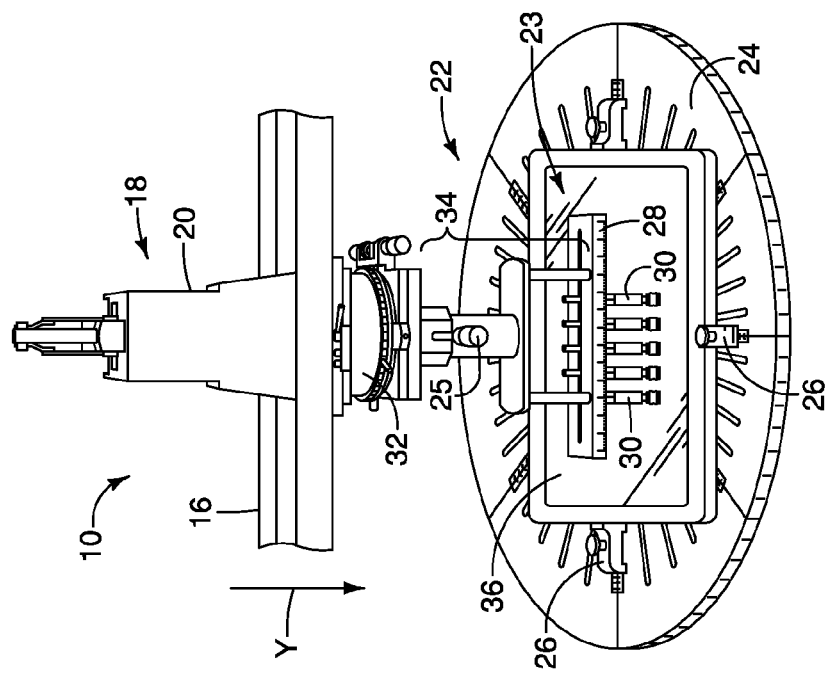

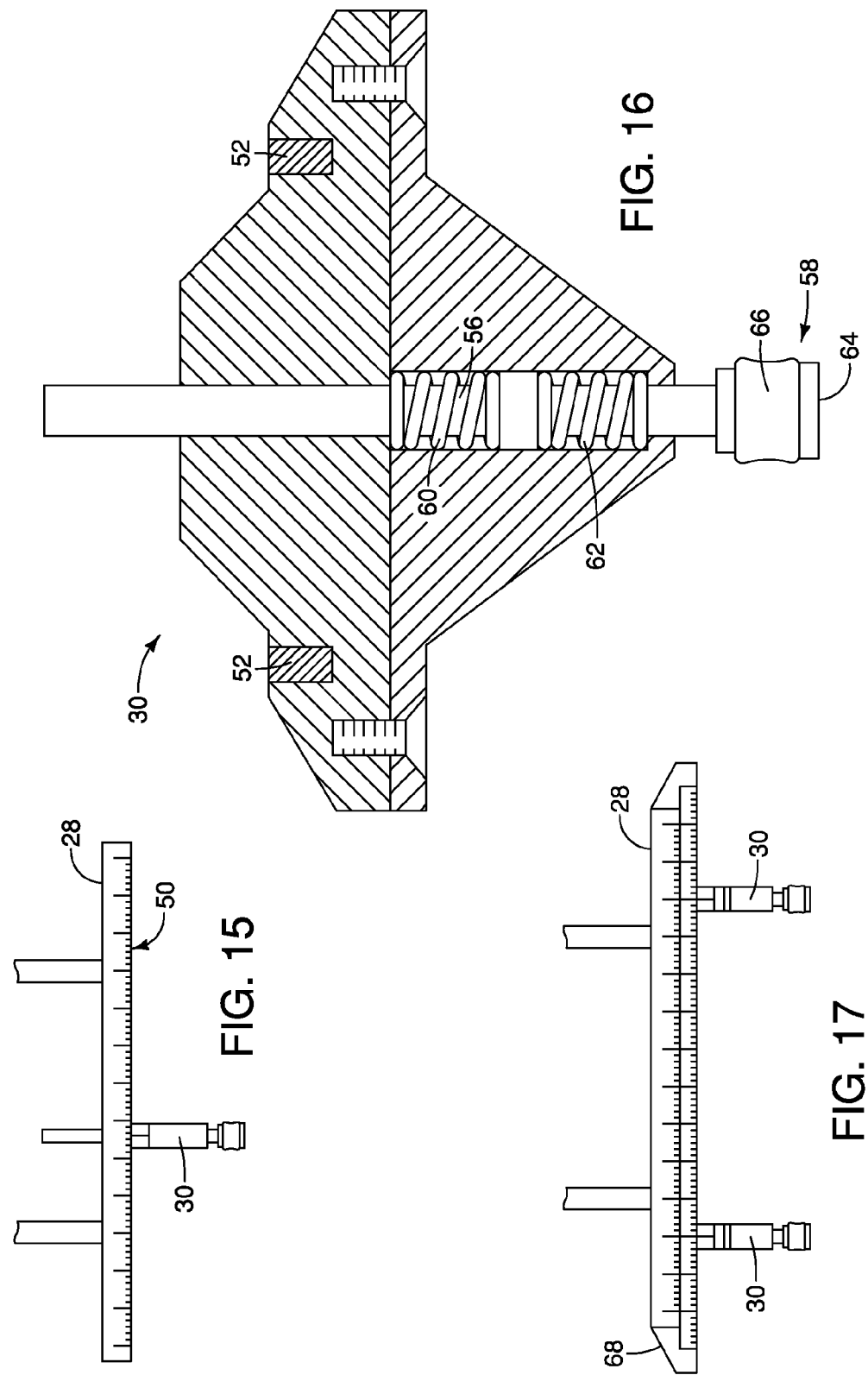

INPUT TESTING TOOL

BACKGROUND

Testing touch and near-touch device displays can be a challenging task due to the precision that is typically utilized, along with the desirability for repeatability for different testing scenarios. These testing scenarios often involve testing a wide range of functionality that is utilized to test touch and near-touch inputs. These inputs can include linear motion inputs, rotational inputs, tapping inputs, and converging and diverging inputs such as "pinch" and "spread" gestures.

One way of testing such inputs is to use individual stencil guides and actuators for each particular different type of input that is desired to be tested. Stencils are typically not adjustable which, in turn, leads to a situation in which each different type of input utilizes a different dedicated stencil.

SUMMARY

This Summary is provided to introduce a selection of concepts in a simplified form that are further described below in the Detailed Description. This Summary is not intended to identify key features or essential features of the claimed subject matter.

Various embodiments provide an input test tool that promotes precision testing, flexibility and repeatability over a wide variety of functionality tests that are utilized in both touch and near-touch input scenarios. The input test tool enables a variety of degrees of motion, including both linear and rotational motion, so that a device under test can be tested utilizing a number of different linear and/or rotational input scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIGS. 6-9 illustrate the input test tool being utilized in another example testing scenario.

FIG. 15 illustrates an example actuator assembly in accordance with one or more embodiments.

FIG. 16 illustrates an example actuator, in a side sectional view, in accordance with one or more embodiments.

FIG. 17 illustrates an example actuator assembly in accordance with one or more embodiments.

DETAILED DESCRIPTION

Overview

Figure 1:
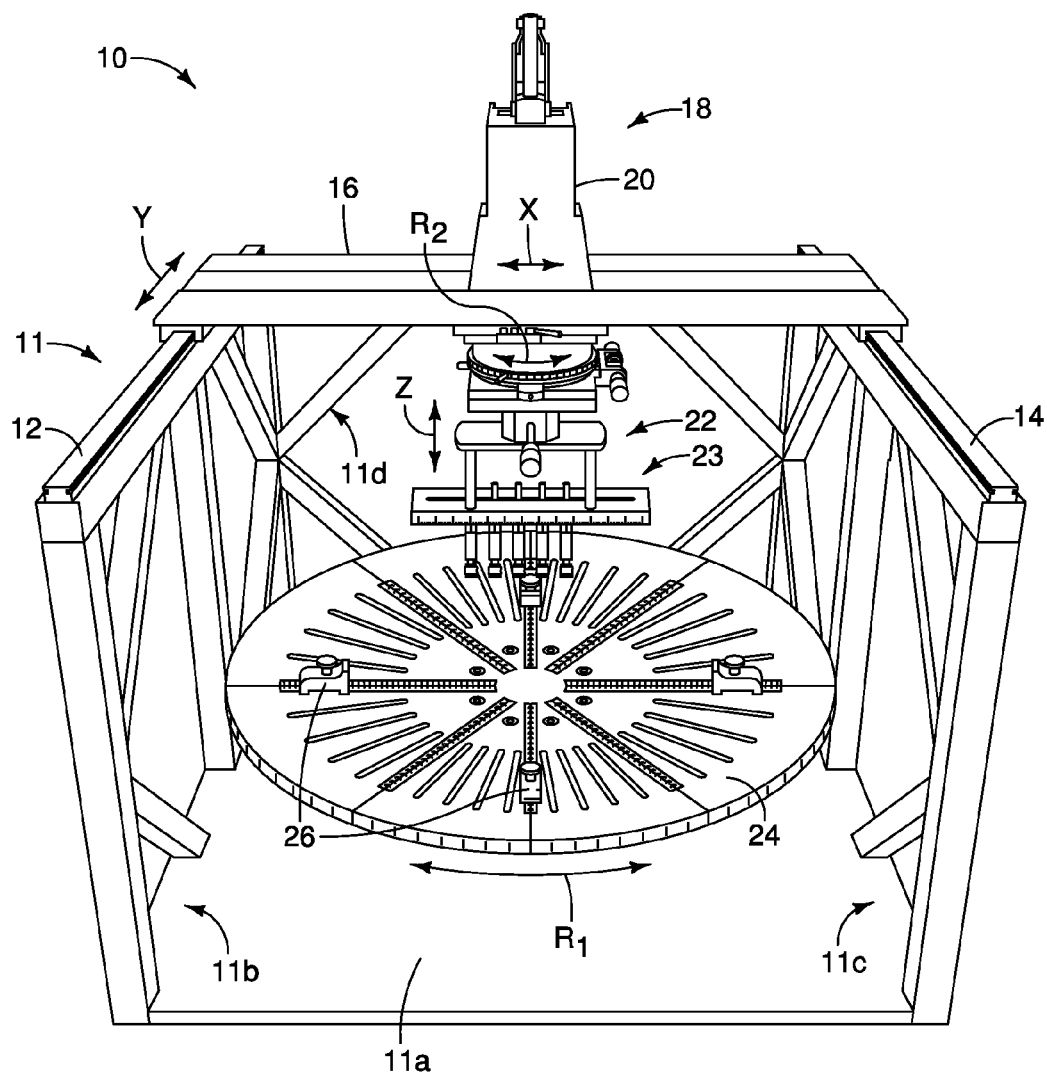
FIG. 1 is an isometric illustration of an example input test tool in accordance with one or more embodiments.

Various embodiments provide an input test tool that promotes precision testing, flexibility and repeatability over a wide variety of functionality tests that are utilized in both touch and near-touch input scenarios. The input test tool enables a variety of degrees of motion, including both linear and rotational motion, so that a device under test can be tested utilizing a number of different linear and/or rotational input scenarios. In one or more embodiments, the input test tool can be configured to operate in a manual mode. Alternately or additionally, the input test tool can operate in an automated mode.

In various embodiments, the input test tool is reconfigurable to promote a variety of different touch and near-touch tests. This can be done through the use of one or more actuators which are removably mountable on the input test tool to accommodate a variety of testing scenarios. In addition, a variety of degrees of motion can be utilized including, by way of example and not limitation, linear motion in the X-axis and Y-axis directions, as well as in the Z-axis direction for height adjustments. Further, one or more rotational degrees of motion can be provided. Rotational degrees of motion can be utilized to rotationally position a device under test and/or to provide an arc motion in which one or more actuators can be moved in an arc relative to a device display. The various tests that can be performed can include testing a display device, as described below, or any other structure that receives touch input, such as a touch pad.

In the discussion that follows, a section entitled "Example Input Testing Tool" describes an example input testing tool in accordance with one or more embodiments. Following this, a section entitled "X-axis Motion" describes an example input test scenario in accordance with one or more embodiments. Next, a section entitled "Y-axis Motion" describes an example input test scenario in accordance with one or more embodiments. Following this, a section entitled "Z-axis Motion" describes an example input test scenario in accordance with one or more embodiments. Next, a section entitled "R1-axis Motion" describes an example input test scenario in accordance with one or more embodiments. Following this, a section entitled "R2-axis Motion" describes an example input test scenario in accordance with one or more embodiments. Next, a section entitled "Cross Rail Bracket and Actuator" describes an example cross rail bracket in accordance with one or more embodiments. Following this, a section entitled "Pinch Hanger" describes an example pinch hanger in accordance with one or more embodiments. Next, a section entitled "Automated Mode Testing" describes an example embodiment in which testing can be conducted in an automated fashion in accordance with one or more embodiments. Last, a section entitled "Example Device" describes an example device in accordance with one or more embodiments.

Having provided an overview of various embodiments that are to be described below, consider now an example input testing tool in accordance with one or more embodiments.

Example Input Testing Tool

Figure 1A:
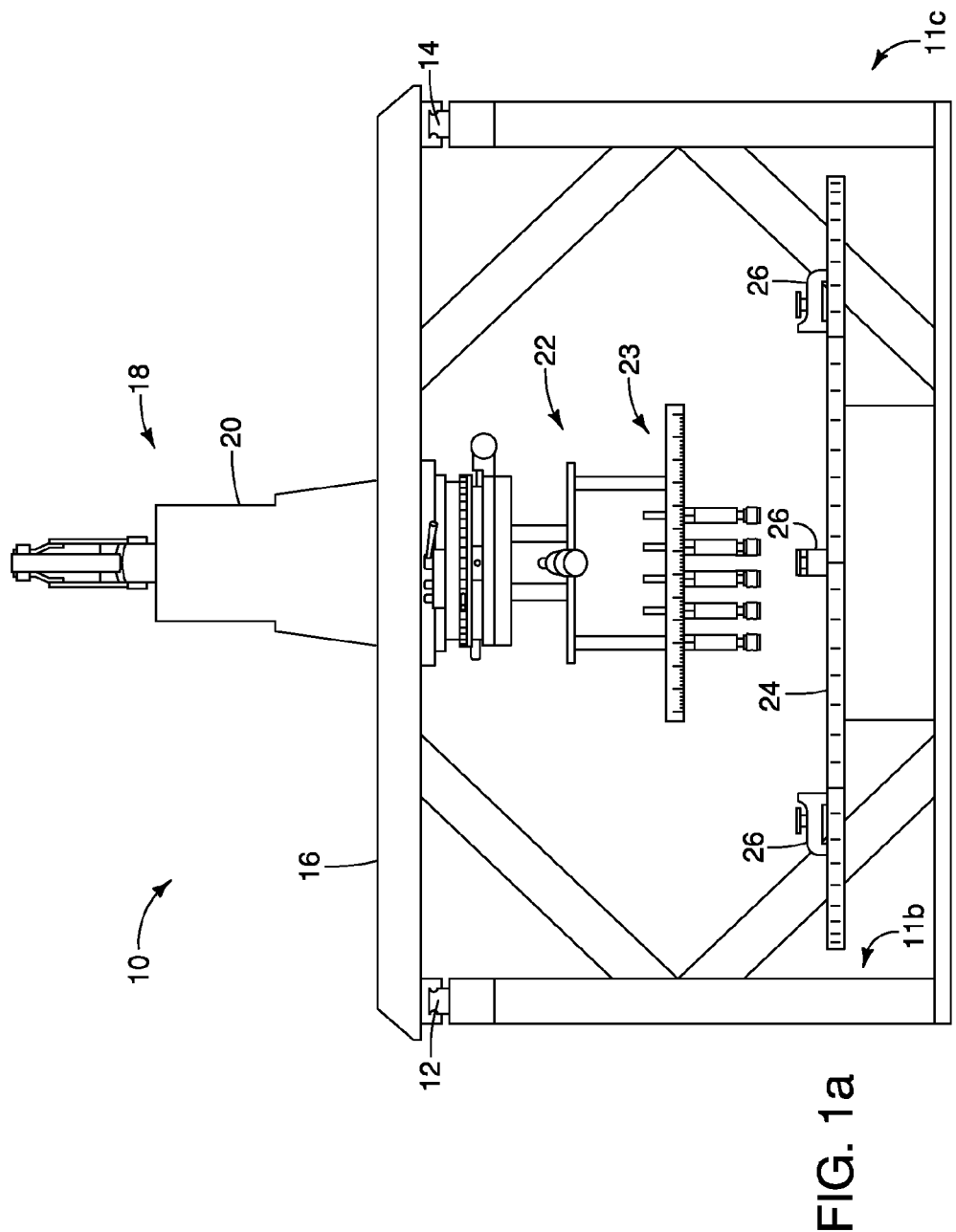
FIG. 1a is a front elevation view of the input test tool of FIG. 1.

FIGS. 1 and 1a illustrate an example input testing tool in accordance with one or more embodiments, generally at 10. The input testing tool 10 includes a frame 11 having a base 11a, a pair of generally opposed sidewalls 11b, 11c mounted to base 11a, and a rear wall 11d mounted to base 11a and both sidewalls 11b, 11c. Each sidewall 11b, 11c supports a respective side rail 12, 14.

The input testing tool 10 includes a transverse rail 16 slidably mounted on side rails 12, 14 for reciprocation along the side rails. A carriage 18 is slidably mounted on transverse rail 16 for reciprocation along the transverse rail and includes an upper portion 20 that resides generally above the transverse rail 16, and a lower portion 22 that resides generally beneath the transverse rail 16. The lower portion 22 of carriage 18 supports an actuator assembly 23 described in more detail below.

The input testing tool 10 also includes a platform 24 that is rotatably mounted on base 11a. The platform 24 includes a plurality of locking members, two of which are illustrated at 26. The locking members 26 enable a device under test to be secured to platform 24 during testing.

In operation, as noted above, the input test tool 10 enables a variety of degrees of motion, including both linear and rotational motion, so that a device under test can be tested utilizing a number of different linear and/or rotational input scenarios. In the illustrated and described embodiment, linear motion can occur along the X-axis, Y-axis, and Z-axis.

Linear motion along the X-axis occurs by moving carriage 18 along the transverse rail 16 in the direction of the double-headed arrow designated "X". Linear motion along the Y-axis occurs by moving transverse rail 16 in the direction of the double-headed arrow designated "Y" along side rails 12, 14. Linear motion along the Z-axis occurs by moving at least a portion of carriage 18 in the direction of the double-headed arrow designated "Z", thus changing the height of the carriage's lower portion 22 relative to the device under test that is mounted on platform 24.

In the illustrated and described embodiment, rotational motion can be achieved along the plurality of different rotation axes. In this specific example, a first rotation axis R1 enables platform 24 and hence, a device under test, to be rotated relative to carriage 18. A second rotation axis R2 enables the lower portion 22 and hence, the actuator assembly 23, to be rotated relative to the device under test mounted on platform 24. Example usage scenarios are described just below.

X-Axis Motion

Figure 2:
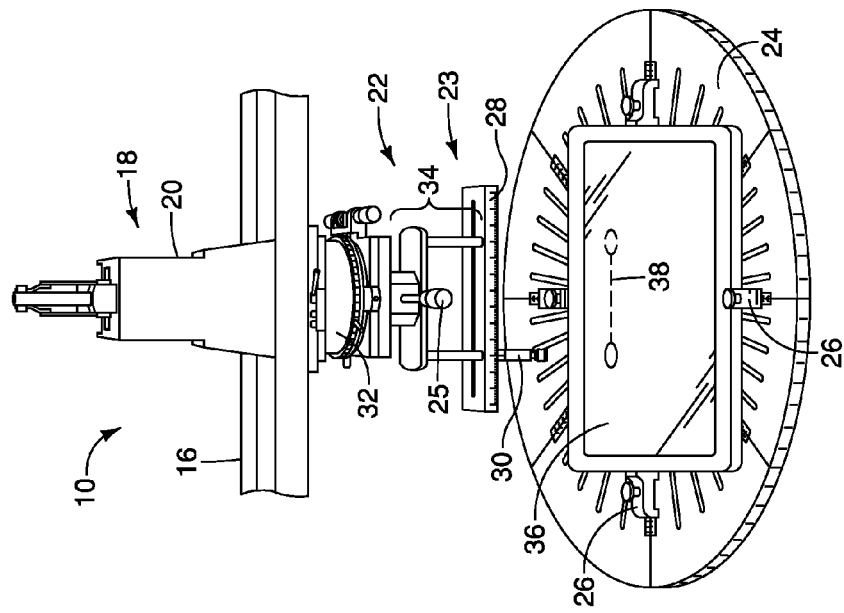

FIG. 2 illustrates the input test tool 10 in additional detail in a configuration in which motion along the X-axis is utilized for a device under test. Here, actuator assembly 23 of carriage 18 includes a cross rail bracket 28 that is configured to removably receive one or more actuators, an example of which is shown at 30. The actuator assembly 23 includes a rotational stage 32 connected to cross rail bracket 28 by way of a linkage 34. Here, a device under test 36 is shown locked into platform 24 by way of locking members 26. A test pattern 38 is shown on the display device of device under test 36.

Figure 3:
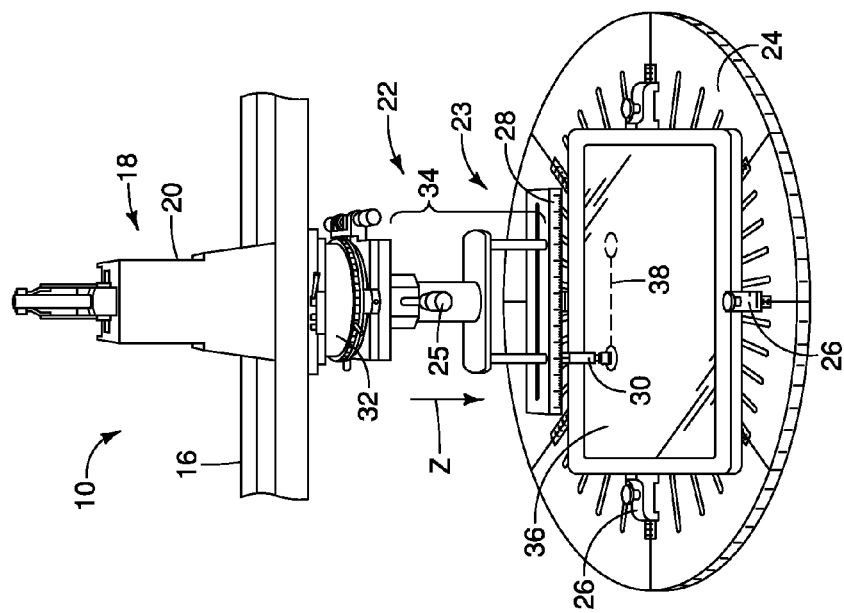
FIGS. 2-5 illustrate the input test tool being utilized in an example testing scenario.

In operation, the X-axis functions to enable alignment of actuators, such as actuator 30, with a desired x starting position on the display device of the device under test 36. Once aligned, movement in the Y-axis direction can be locked by a locking mechanism (not specifically shown). Once the actuators have been aligned with the test pattern 38, the actuator assembly 23 can be lowered to test the device under test. As an example, consider FIG. 3.

There, the actuator assembly 23 has been lowered by virtue of a handle (not specifically shown) to bring actuator 30 into an operative testing position with respect to the display device of device under test 36. The operative testing position can be a touch-position in which the actuator 30 physically engages the display device. Alternately, the operative testing position can be a near-touch-position in which the actuator 30 does not physically engage the display device. Such would be the case in scenarios where the display device is configured with capacitive, optical, resistive and/or any other type of near-field sensing capabilities.

Figure 4:
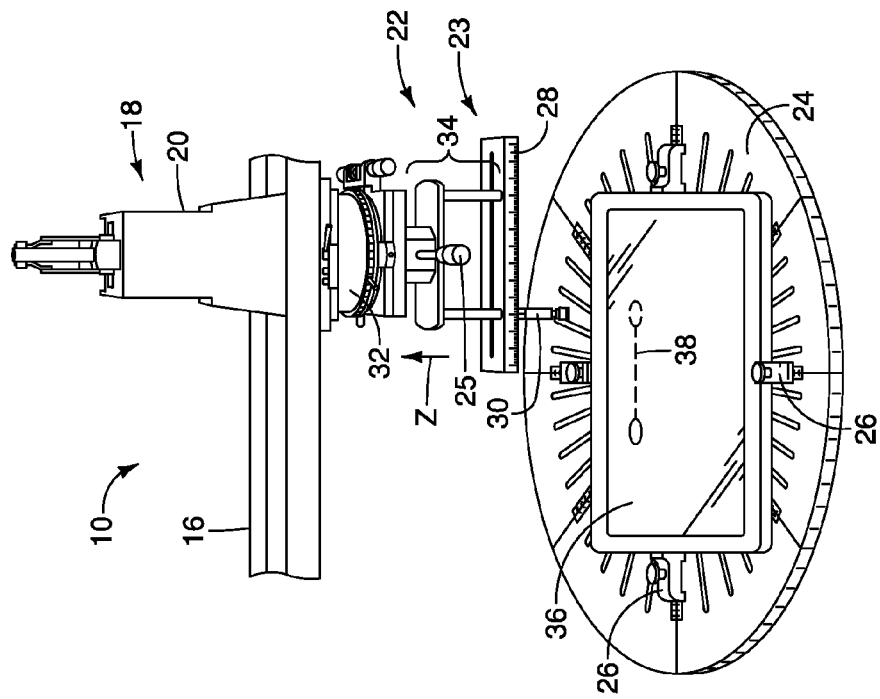

Once in the operative testing position, carriage 18 and hence, actuator 30 can be moved in the X direction along the test pattern 38. This movement can be facilitated by virtue of four pre-loaded bearings coupled between the carriage 18 and transverse rail 16. As an example, consider FIG. 4.

Figure 5:
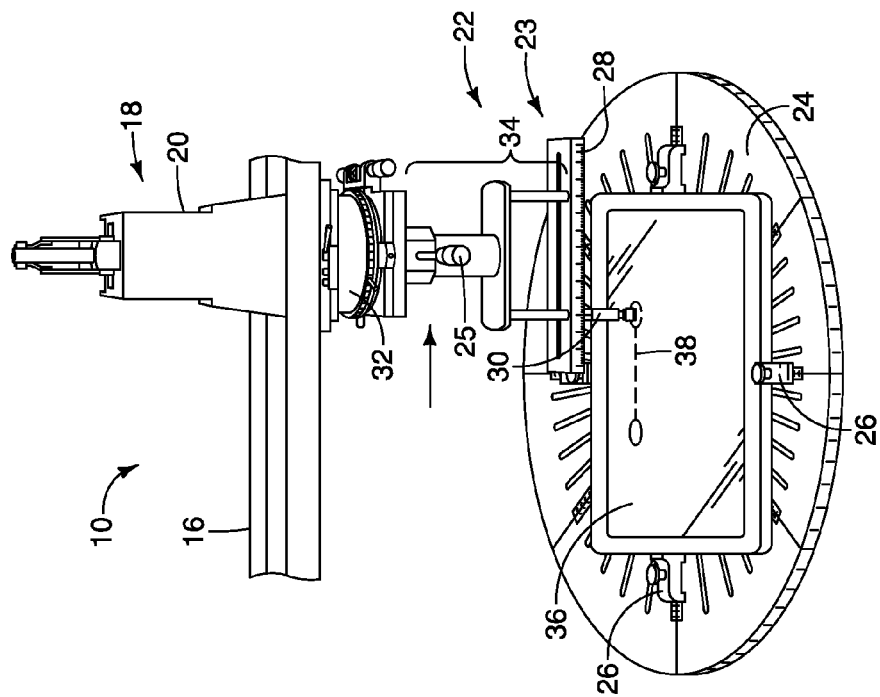

There, carriage 18 has been moved along the X-axis to the right. Once movement along the test pattern 38 has been completed, the carriage 18 can be returned to its original z position as indicated in FIG. 5.

Y-Axis Motion

Figure 6:
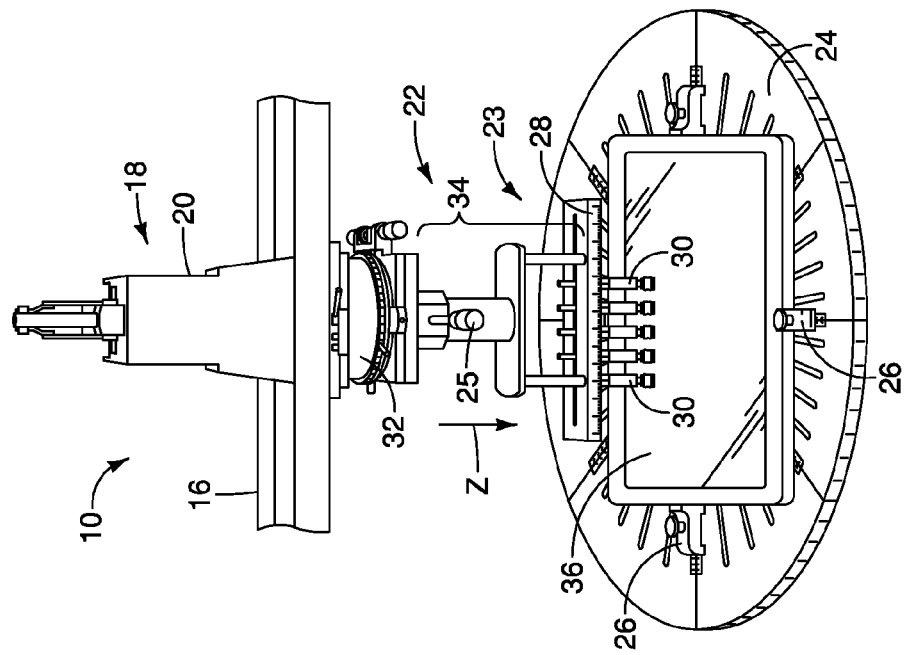

FIG. 6 illustrates the input test tool 10 in additional detail in a configuration in which motion along the Y-axis is utilized for a device under test. Here, the cross rail bracket 28 includes a plurality of actuators 30 that have been removably mounted thereon. Here, the device under test 36 is shown locked into platform 24 by way of locking members 26, as in the above example.

Figure 7:
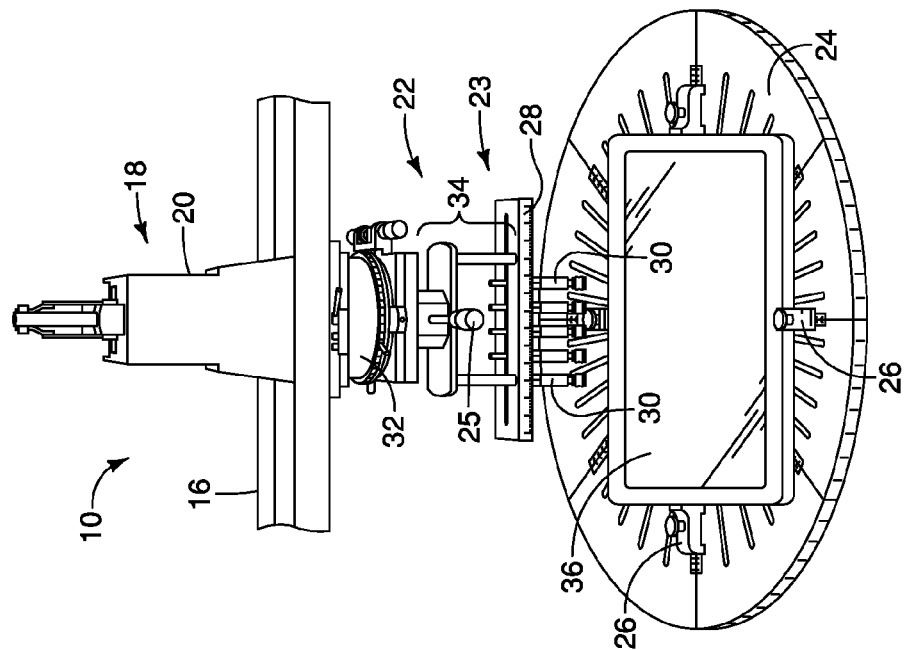

In operation, the Y-axis functions to enable alignment of actuators, such as actuators 30, with a desired y starting position on the display device of the device under test 36. Once aligned, movement in the X-axis direction can be locked by a locking mechanism (not specifically shown). Movement in the Y-axis direction can be utilized for swipe tests. Once the actuators have been aligned to the display device as, for example, by being aligned with a test pattern, the actuator assembly 23 can be lowered to test the device under test. As an example, consider FIG. 7.

There, the actuator assembly 23 has been lowered by virtue of a handle (not specifically shown) to bring actuators 30 into an operative testing position with respect to the display device of device under test 36. The operative testing position can be a touch-position in which the actuators 30 physically engage the display device. Alternately, the operative testing position can be a near-touch-position in which the actuators 30 do not physically engage the display device.

Once in the operative testing position, carriage 18 and hence, actuators 30 can be moved in the Y direction along the display device. This movement can be facilitated by virtue of four pre-loaded bearings coupled between the carriage 18 and the side rails 12, 14 (FIG. 1). As an example, consider FIG. 8.

There, carriage 18 has been moved along the Y-axis in a direction toward the reader. Once movement along the display device has been completed, the carriage 18 can be returned to its original z position as indicated in FIG. 9. Notice the illustrated tracings on the display device that indicate the area over which the testing has taken place.

Z-Axis Motion

In the illustrated and described embodiment, the Z-axis is concentric with the R2-axis, as perhaps best illustrated in FIG. 1, and perpendicular to the plane formed by the X and Y axes. Motion in the Z-axis direction controls the vertical location of the actuator assembly 23 relative to the display device of the device under test, as should be evident from the examples above.

In the illustrated and described embodiment, the Z-axis uses a counterbalance spring within linkage 34 to remain stationary once positioned. A threaded knob, not specifically shown, is included in linkage 34 and is used as a lock for motion in the Z-axis direction. A high precision ball spline and a bearing allow for Z-axis motion to not interfere with R2-axis motion.

R1-Axis Motion

Figure 10:
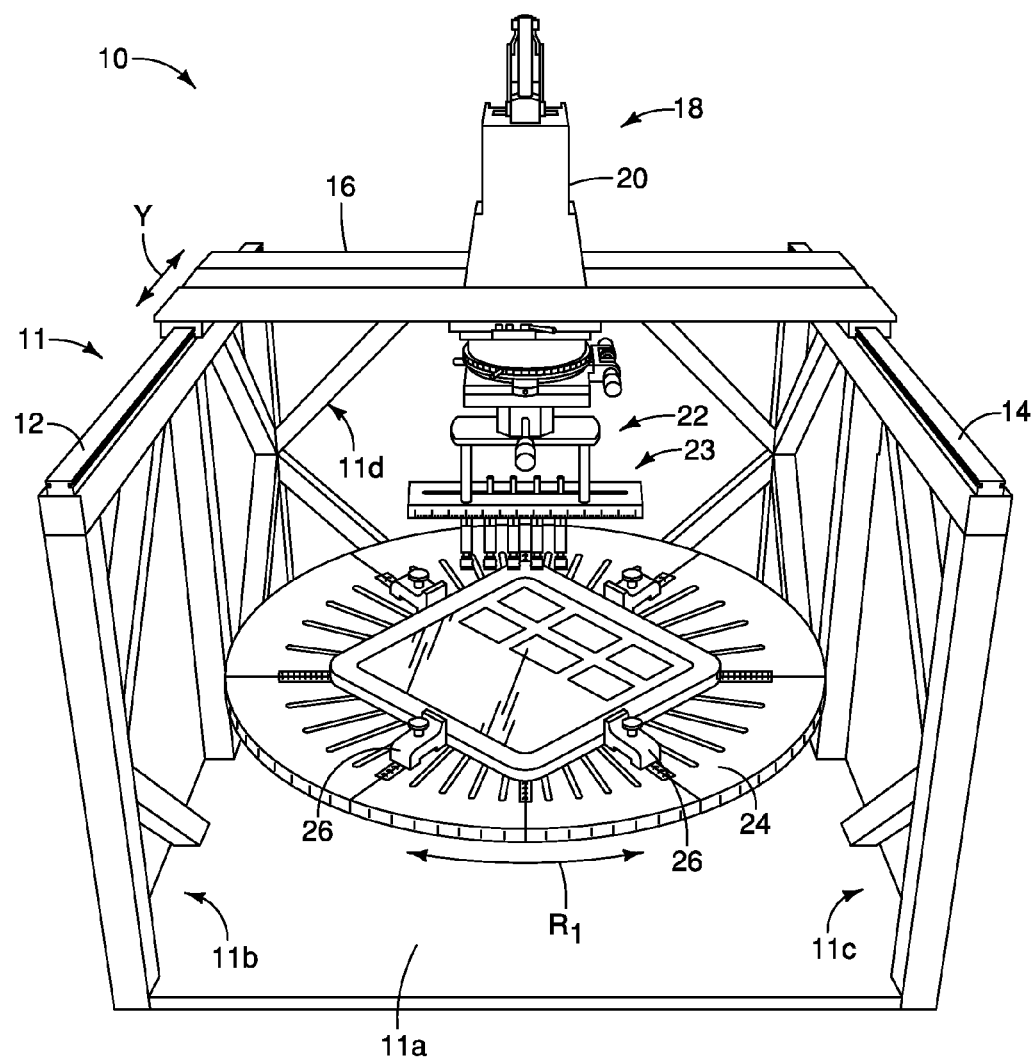
FIG. 10 illustrates the input test tool being utilized in another example testing scenario.

Referring to FIG. 10, the R1-axis permits rotational motion of the platform 24 and hence, the device under test. Rotational motion about the R1-axis allows for 360° of freedom which rotates the device under test in a plane parallel to the Y-axis. Rotation of platform 24 is achieved using a rotational stage which is mounted underneath platform 24 and connected to base 11a. Any suitably-configured rotational stage can be utilized. In addition, the rotational stage includes a locking mechanism so that the rotational movement of the platform 24 can be locked. This permits inputs, such as swipes, to be applied to the display device at various angles. For example, in some test scenarios it may be desirable to apply a linear swipe at a 45° angle relative to one of the sides of the device under test as shown in FIG. 10. In this case, the rotational stage can be unlocked and the platform 24 can be rotated 45°. The rotational stage can now be locked and the desired input can be applied to the display device of the device under test.

R2-Axis Motion

In the illustrated and described embodiment, the R2-axis provides rotational motion for the actuator assembly 23. This is achieved through the use of a rotational stage 32 that is mounted between transverse cross rail 16 and linkage 34. Rotational motion about the R2-axis allows for 360° of freedom which rotates the actuator assembly 23 about the Z-axis. Specifically, the R2-axis is concentric with the Z-axis. This is achieved by utilizing a Z-axis ball spline through the center of rotational stage 32.

In addition, the rotational stage 32 includes a locking mechanism so that the rotational movement of the actuator assembly 23 can be locked in place during linear motion and static tests.

Figure 11:
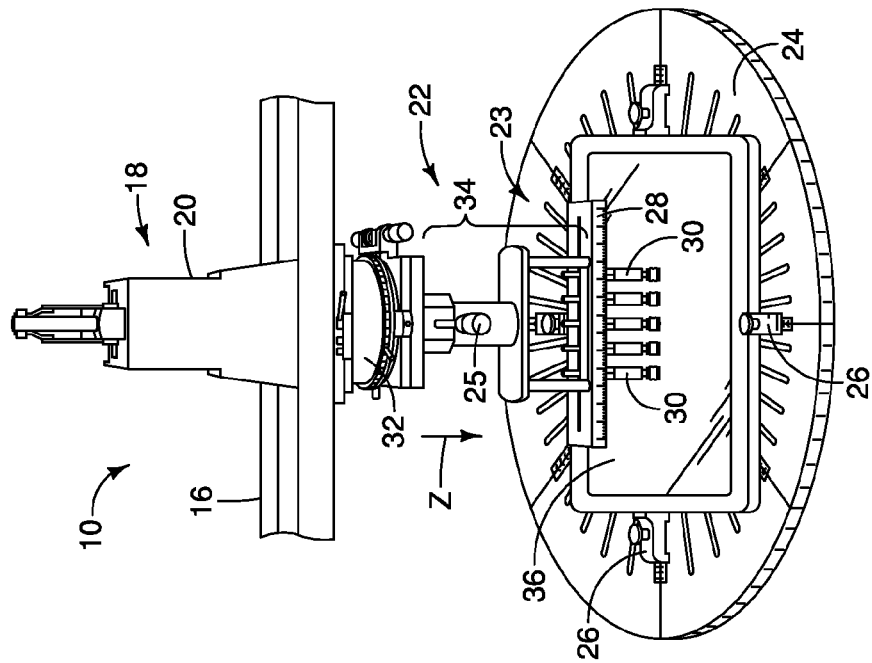
FIGS. 11-14 illustrate the input test tool being utilized in another example testing scenario.

FIG. 11 illustrates the input test tool 10 in a configuration in which rotational motion about the R2-axis is utilized for a device under test.

Figure 12:
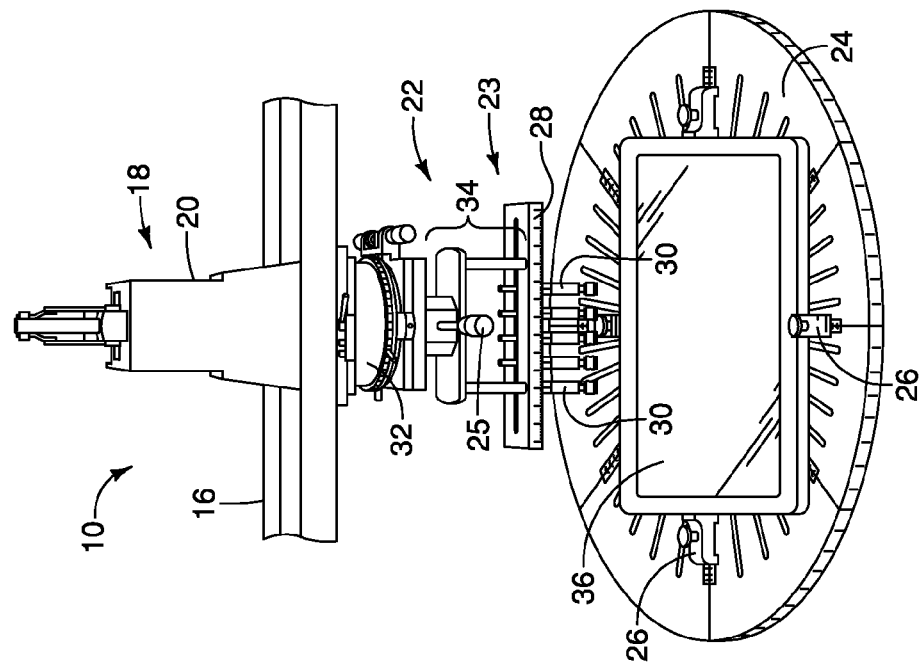

In operation, the once the actuator assembly 23 is aligned, movement in the X-axis and Y-axis directions can be locked. The actuator assembly 23 can now be lowered to test the device under test. As an example, consider FIG. 12.

There, the actuator assembly 23 has been lowered by virtue of a handle (not specifically shown) to bring actuators 30 into an operative testing position with respect to the display device of device under test 36. The operative testing position can be a touch-position in which the actuators 30 physically engage the display device. Alternately, the operative testing position can be a near-touch-position in which the actuators 30 do not physically engage the display device.

Figure 13:
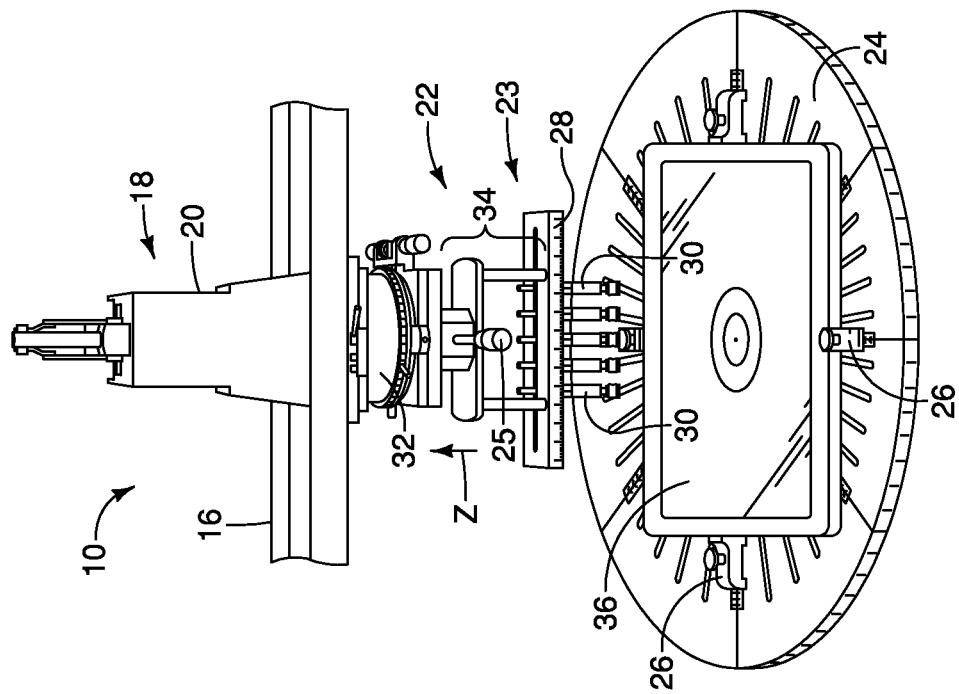
Figure 14:
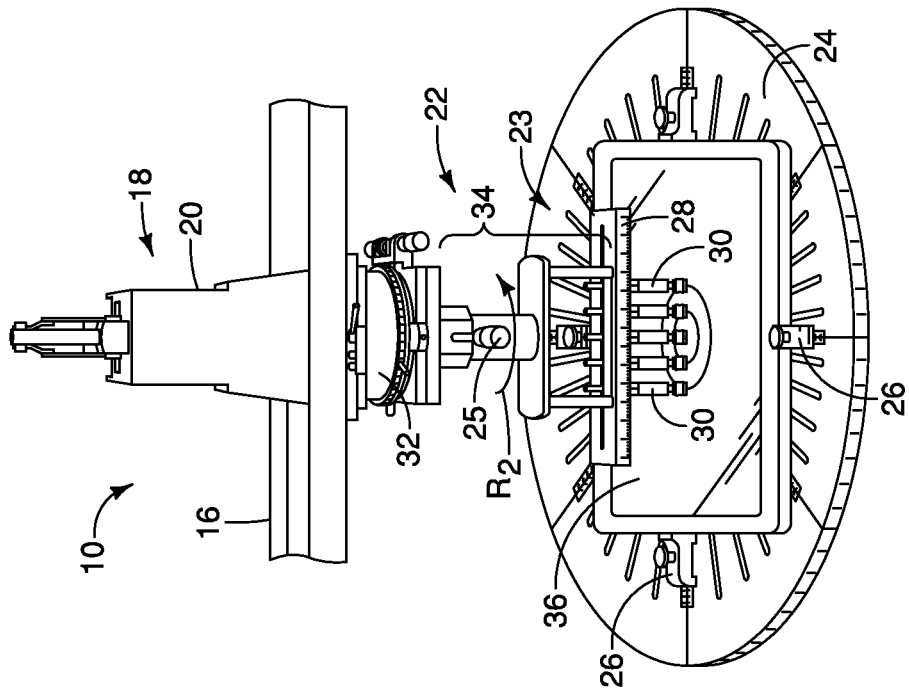

Once in the operative testing position, lower portion 22 of carriage 18 can be rotationally moved about the R2-axis by virtue of handle 25. As an example, consider FIG. 13. There, the actuator assembly 23 has been rotated 360° about the Z-axis to provide the illustrated traces. Once movement about the Z-axis has been completed, the lower portion 22 of carriage 18 can be returned to its original z position as indicated in FIG. 14.

Cross Rail Bracket and Actuator

FIG. 15 shows cross rail bracket 28 in more detail and FIG. 16 shows an actuator in more detail in accordance with one or more embodiments.

As noted above, cross rail bracket 28 is used as a carriage to mount one or more actuators 30 onto the input test tool 10. The cross rail bracket is configured to enable the actuators 30 to be removably mounted thereon. Any suitable type of arrangement can be utilized to enable the actuators 30 to be removably mounted, an example of which is provided below.

In the illustrated and described embodiment, a metric scale 50 is provided on the cross rail bracket 28 to enable precise alignment of the actuators.

FIG. 16 illustrates an example actuator 30 in a side sectional view having a cutaway to show internal structure. In the illustrated and described embodiment, the cross rail bracket 28 is made from steel and each actuator 30 includes two or more magnets 52 which are utilized to enable the actuator 30 to be removably mounted on the cross rail bracket 28. The actuator 30 includes a central rod 56 that extends along an axis towards a terminus 58. Two coil springs 60, 62 are mounted to be concentric with rod 56 so as to allow the terminus 58 to be biased against the display device. Allowing the terminus 58 to be biased against the display device provides a degree of tolerance for uneven screen surfaces. Spring 60 biases the terminus against the display device while spring 62 allows the terminus 58 to return to its z height. For tap tests, the z height of the actuator can be adjusted so that the terminus 58 resides just above the display device. Rod 56 can then be tapped to move it downward to contact the display device, with spring 62 returning the terminus 58 to its original z height. In one or more embodiments, the force with which the terminus is placed into contact with the display device can be varied. One way in which this can be accomplished is to replace one or more of the springs with different springs having different spring constants. Other techniques can, of course, be used without departing from the spirit and scope of the claimed subject matter.

In the illustrated and described embodiment, terminus 58 includes a conductive tip 64 that can be made from any suitable type of conductive material. In the illustrated and described embodiment, the conductive tip 64 is made from brass which is then wrapped with a conductive fabric. The conductive fabric can comprise any suitable type of conductive fabric. In the illustrated and described embodiment, the conductive fabric is formed from a shielding material such as that used for EMF shielding. A piece of heat shrink material 66 holds the conductive fabric in place on the tip. It is to be appreciated and understood that the tip can be formed from any suitable type of material, including materials that are not conductive in nature, such as various plastics as well as other materials.

Pinch Hanger

FIG. 17 illustrates cross rail bracket 28 having a pinch hanger bracket 68 mounted beneath it. The pinch hanger bracket 68 includes a similar metric scale to enable precise mounting of the actuators. The pinch hanger bracket 68 can be removably secured beneath the cross rail bracket 28 using any suitable type of mechanical arrangement. The pinch hanger bracket 68 is configured to enable actuators 30 to be removably mounted thereon. In operation, the pinch hanger bracket 68 is configured to enable pinch-type inputs to be applied to the display device of a device under test. The actuators 30 ride along a rail which enables the actuators to be moved towards and away from one another. As an example, consider FIGS. 18-21.

Figure 18:
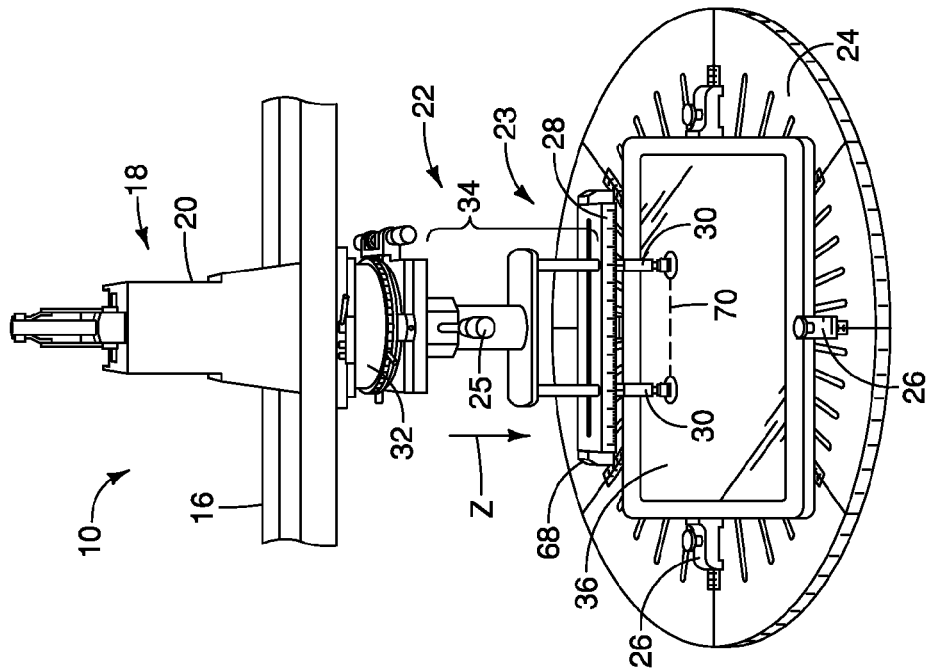
FIGS. 18-21 illustrate the input test tool being utilized in another example testing scenario.
Figure 19:
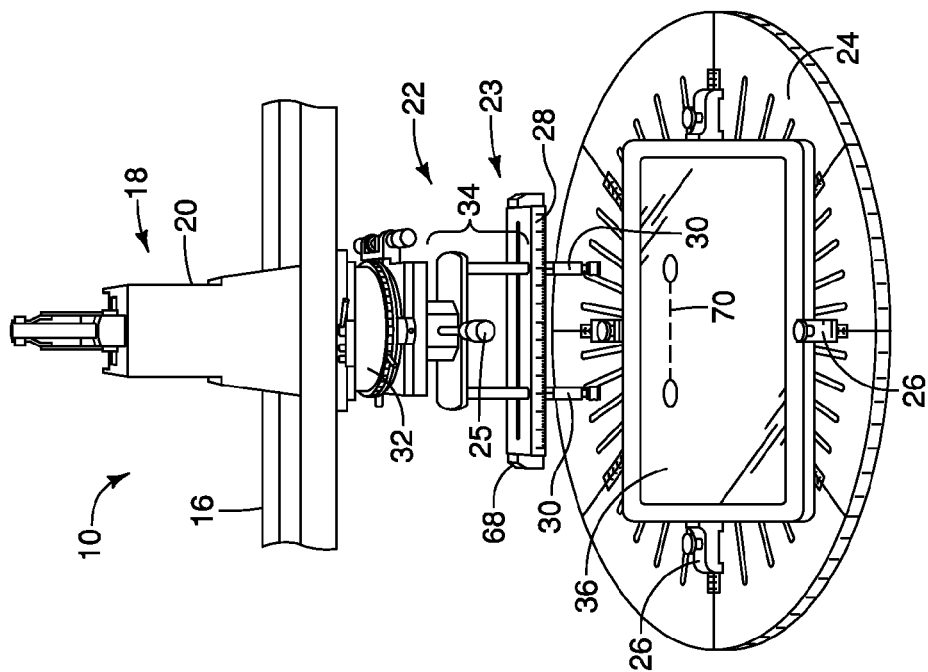
Figure 20:
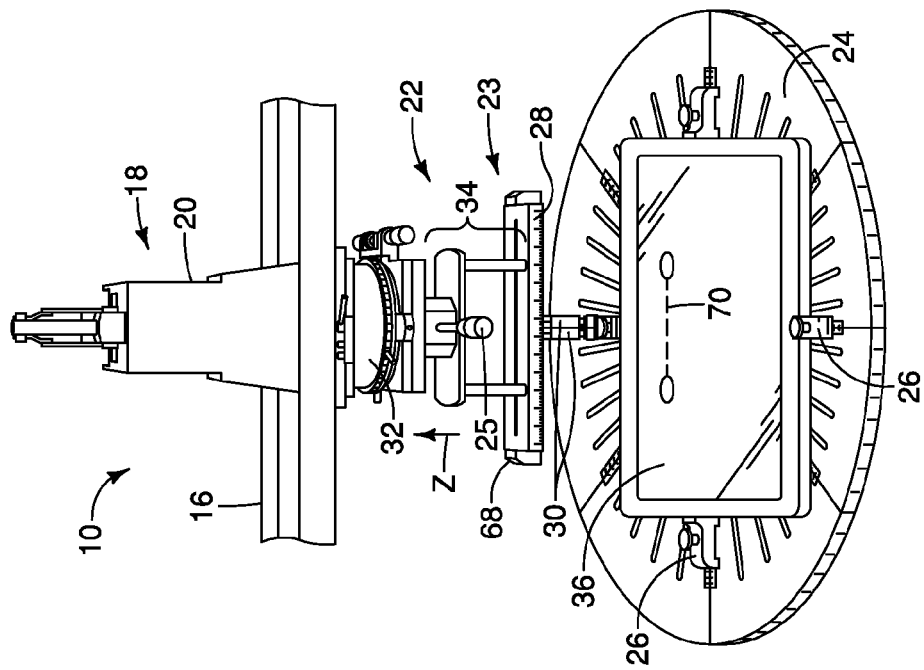

FIG. 18 illustrates the input test tool 10 in additional detail in a configuration in which a pinch test is to be conducted. Here, actuator assembly 23 includes two actuators 30 mounted in the pinch hanger bracket 68 which, in turn, is mounted to cross rail bracket 28. A test pattern 70 is shown on the display device of device under test 36.

In operation, once the actuators are aligned in the X and Y directions, movement in the X-axis and Y-axis directions can be locked by a locking mechanism (not specifically shown).

Once these directions are locked, the actuator assembly 23 can be lowered to test the device under test. As an example, consider FIG. 19.

There, the actuator assembly 23 has been lowered by virtue of a handle (not specifically shown) to bring actuators 30 into an operative testing position with respect to the display device of device under test 36. The operative testing position can be a touch-position in which the actuators 30 physically engage the display device. Alternately, the operative testing position can be a near-touch-position in which the actuators 30 do not physically engage the display device.

Once in the operative testing position, the actuators 30 can be moved toward one another along the test pattern 70 to provide a pinch input. As an example, consider FIG. 20 which shows the actuators 30 having been moved toward one another to the center of the test pattern 70.

Figure 21:
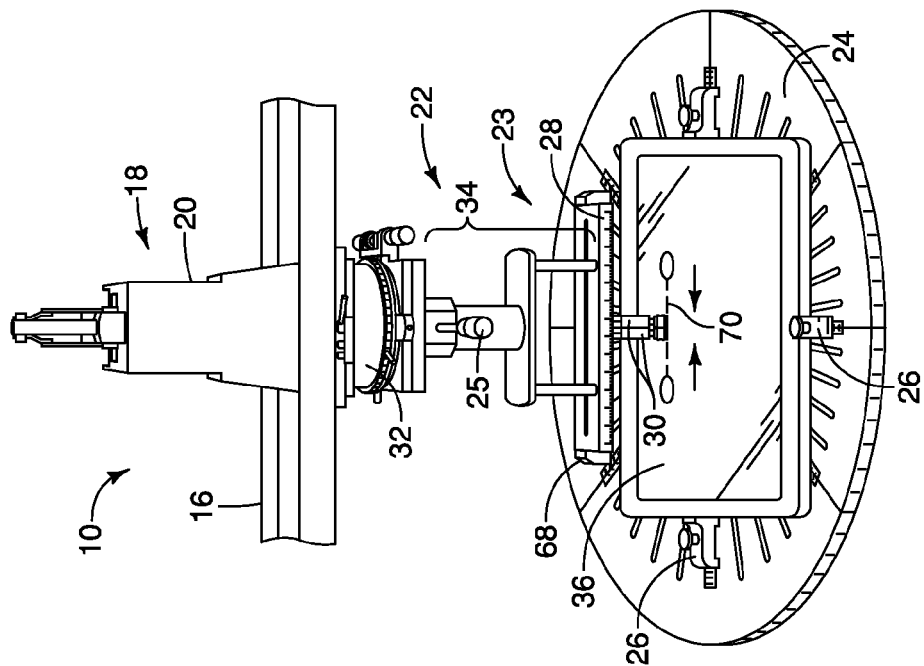

Once movement along the test pattern 70 has been completed, the carriage 18 can be returned to its original z position as indicated in FIG. 21.

Automated Mode Testing

As noted above, in one or more embodiments, the input test tool can be configured to operate in an automated mode. In these embodiments, suitably-configured motors, such as servo motors, stepper motors, and the like, can move the carriage 18 and lower portion 22 to achieve movement in the X-axis direction, Y-axis direction, Z-axis direction, and both R1 and R2 axes. In addition, a camera or cameras can be mounted on the input test tool to acquire a test pattern and suitably configured software can then appropriately position the actuator assembly 23 for testing a device under test.

Example Methods

Figure 21A:
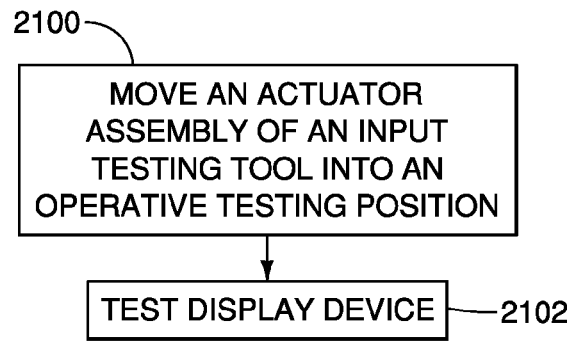
FIGS. 21a-21c are flow diagrams that describe, respectively, steps in a method in accordance with one or more embodiments.

FIG. 21a is a flow diagram that describes steps in a method in accordance with one or more embodiments. The method can be implemented manually. Alternately or additionally, the method can be implemented in any suitable hardware, software, firmware, or combination thereof.

Step 2100 moves an actuator assembly of an input testing tool into an operative testing position relative to a display device of a device under test. In the illustrated and described embodiment, the actuator assembly includes one or more actuators, as noted above. Step 2102 tests the display device of the device under test by moving the actuator or actuators relative to the display device. As noted above, the operative testing position can be a touch-position in which the actuators physically engage the display device. Alternately, the operative testing position can be a near-touch-position in which the actuators do not physically engage the display device.

Movement of the actuator assembly into the operative testing position can occur in any suitable way. For example, in at least some embodiments, the actuator assembly can be moved in one or more of the X-axis direction or the Y-axis direction. Once positioned, the actuator assembly can be moved in the Z-axis direction and into the operative testing position.

The actuators can be moved to affect testing of the display device in any suitable way. For example, the actuator assembly and, hence, the actuators can be moved in the X-axis or Y-axis direction. Alternately or additionally, the actuator assembly can be rotationally moved relative to the display device to affect testing, examples of which are provided above.

In automated scenarios, movement of the actuator assembly and the actuators can be performed under the influence of one or more motors, examples of which are provided above.

Figure 21B:
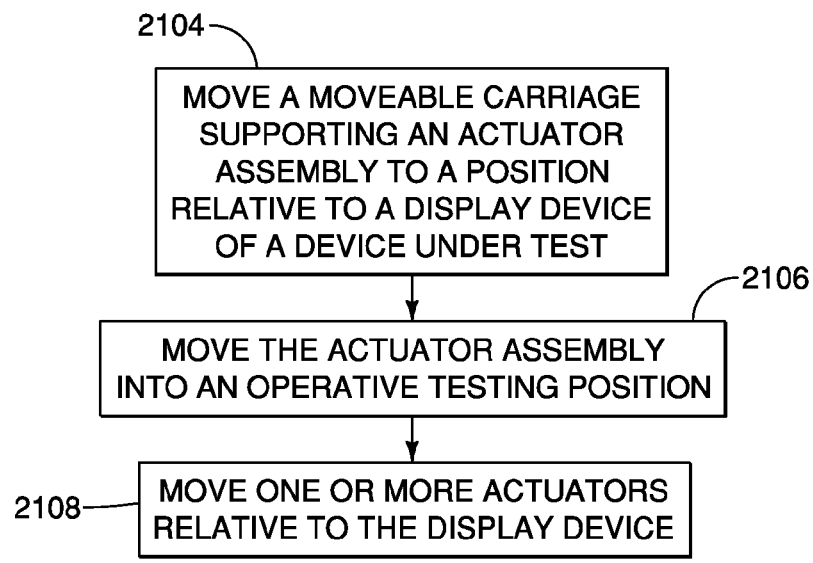

FIG. 21b is a flow diagram that describes steps in a method in accordance with one or more embodiments. The method can be implemented manually. Alternately or additionally, the method can be implemented in any suitable hardware, software, firmware, or combination thereof.

Step 2104 moves a movable carriage supporting actuator assembly into a position relative to a display device of a device under test. The actuator assembly includes one or more actuators that are removably mounted thereon. The movable carriage is movable in an X-axis direction and a Y-axis direction. In the illustrated and described embodiments, the actuator assembly is also movable in the Z-axis direction. Step 2106 moves actuator assembly into an operative testing position. In one or more embodiments, movement of the actuator assembly into the operative testing position occurs in the Z-axis direction. Step 2108 moves one or more actuators relative to the display device.

As noted above, the operative testing position can be a touch-position or a near-touch-position.

Further, movement of the actuators can occur in any of the manners described above. For example, the actuators can be moved in the X-axis direction, the Y-axis direction, and/or relative to or around a rotation axis. Further, movement of the actuators can occur relative to each other to affect, for example, a pinch test.

In automated scenarios, movement of the carriage, actuator assembly and the actuators can be performed under the influence of one or more motors, examples of which are provided above.

Figure 21C:
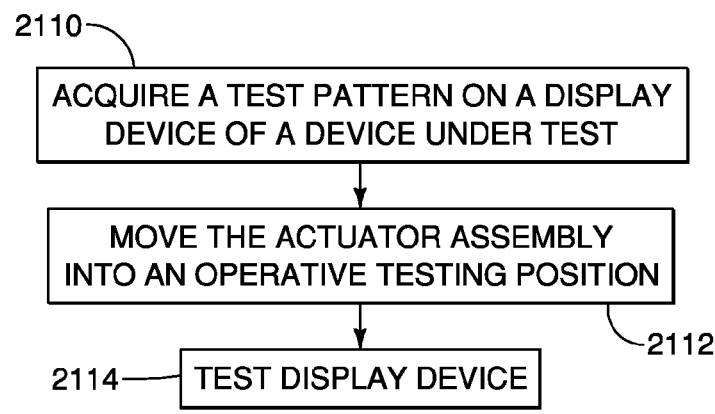

FIG. 21c is a flow diagram that describes steps in an automated method in accordance with one or more embodiments. The method implemented in any suitable hardware, software, firmware, or combination thereof.

Step 2110 acquires a test pattern on a display device of a device under test. This step can be performed by using one or more suitably-configured cameras. The cameras can capture a test pattern that is displayed on the display device and convey test pattern data to testing software for subsequent processing. Step 2112 moves an actuator assembly of an input testing tool into an operative testing position. The actuator assembly includes one or more actuators, such as those described above. Movement of the actuator assembly can occur through the use of one or more motors under the influence of testing software that utilizes the test pattern data captured by the cameras. Step 2114 tests the display device of the device under test space by moving one or more actuators relative to the test pattern on the display device.

Testing of the display device by moving the actuators can occur in any suitable way, examples of which are provided above. In addition, the automated testing space scenario can be used for touch-testing and for near-touch-testing.

Having described example operating environments in which various embodiments can be utilized, consider now a discussion of an example device that can be utilized in an automated testing mode, in accordance with one or more embodiments.

Example Device

Figure 22:
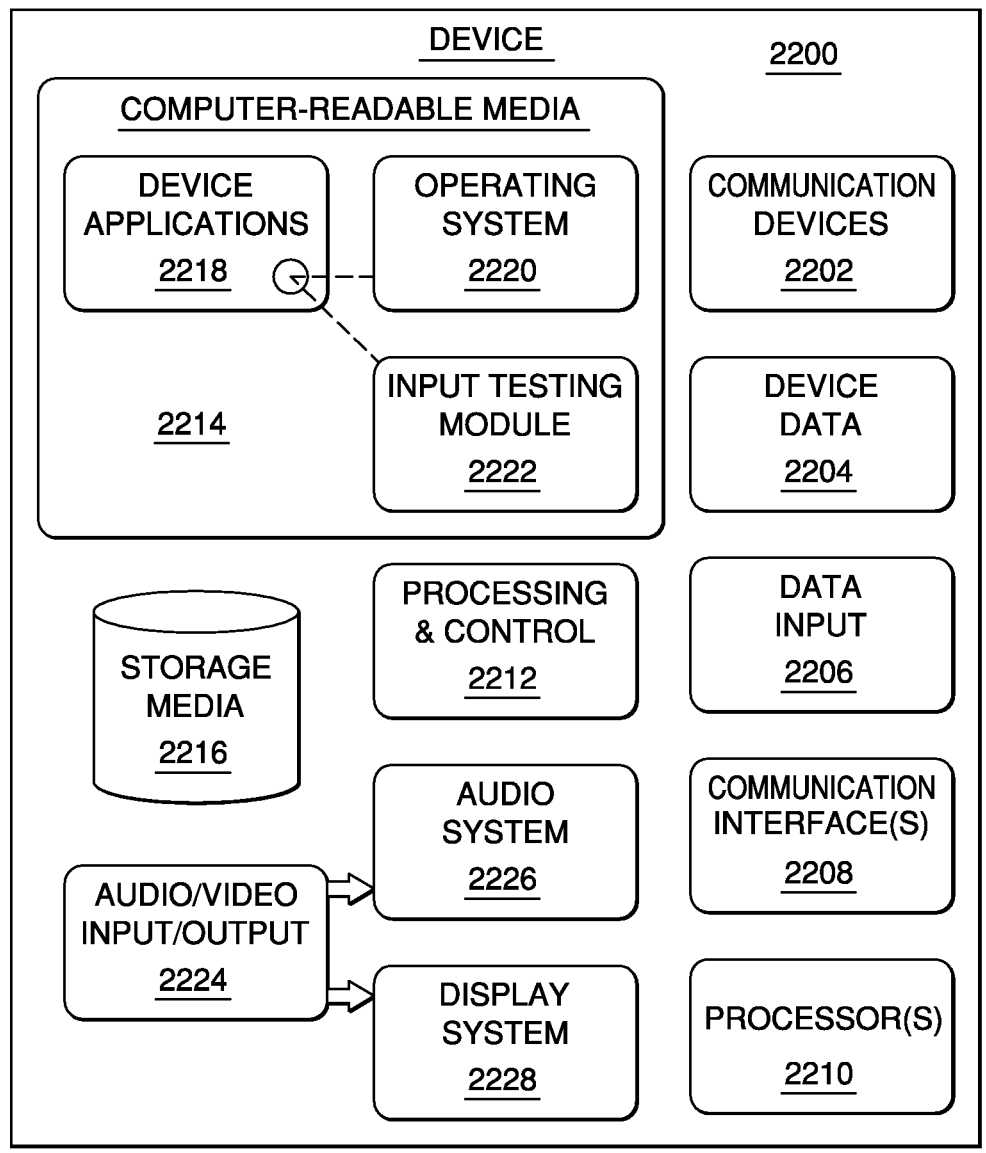
FIG. 22 illustrates an example device that can be utilized for automated testing in accordance with one or more embodiments.

FIG. 22 illustrates various components of an example device 2200 that can be implemented as any type of portable and/or computer device. The computing device can be coupled to the input testing tool 10 and an associated control system that operates one or more motors on the input testing tool 10, under the influence of suitably-programmed software.

Device 2200 includes communication devices 2202 that enable wired and/or wireless communication of device data 2204 (e.g., received data, data that is being received, data scheduled for broadcast, data packets of the data, etc.). The device data 2204 or other device content can include configuration settings of the device, media content stored on the device, and/or information associated with a user of the device. Media content stored on device 2204 can include any type of audio, video, and/or image data. Device 2204 includes one or more data inputs 2206 via which any type of data, media content, and/or inputs can be received, such as user-selectable inputs, messages, music, television media content, recorded video content, and any other type of audio, video, and/or image data received from any content and/or data source.

Device 2200 also includes communication interfaces 2208 that can be implemented as any one or more of a serial and/or parallel interface, a wireless interface, any type of network interface, a modem, and as any other type of communication interface. The communication interfaces 2208 provide a connection and/or communication links between device 2200 and a communication network by which other electronic, computing, and communication devices communicate data with device 2200.

Device 2200 includes one or more processors 2210 (e.g., any of microprocessors, controllers, and the like) which process various computer-executable or readable instructions to control the operation of device 2200 and to implement the embodiments described above. Alternatively or in addition, device 2200 can be implemented with any one or combination of hardware, firmware, or fixed logic circuitry that is implemented in connection with processing and control circuits which are generally identified at 2212. Although not shown, device 2200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2200 also includes computer-readable media 2214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2200 can also include a mass storage media device 2216.

Computer-readable media 2214 provides data storage mechanisms to store the device data 2204, as well as various device applications 2218 and any other types of information and/or data related to operational aspects of device 2200. For example, an operating system 2220 can be maintained as a computer application with the computer-readable media 2214 and executed on processors 2210. The device applications 2218 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 2218 also include any system components or modules to implement embodiments of the techniques described herein. In this example, the device applications 2218 include an input testing module 2222 that is shown as a software module and/or computer application. Input testing module 2222 is representative of software that is used to control testing scenarios, as described above. Alternatively or in addition, input testing module 2222 can be implemented as hardware, software, firmware, or any combination thereof.

Device 2200 also includes an audio and/or video input-output system 2224 that provides audio data to an audio system 2226 and/or provides video data, as from one or more cameras, to a display system 2228 or input testing module 2222 for processing as described above. The audio system 2226 and/or the display system 2228 can include any devices that process, display, and/or otherwise render audio, video, and image data. Video signals and audio signals can be communicated from device 2200 to an audio device and/or to a display device via an RF (radio frequency) link, S-video link, composite video link, component video link, DVI (digital video interface), analog audio connection, or other similar communication link. In an embodiment, the audio system 2226 and/or the display system 2228 are implemented as external components to device 2200. Alternatively, the audio system 2226 and/or the display system 2228 are implemented as integrated components of example device 2200.

CONCLUSION

Various embodiments provide an input test tool that promotes precision testing, flexibility and repeatability over a wide variety of functionality tests that are utilized in both touch and near-touch input scenarios. The input test tool enables a variety of degrees of motion, including both linear and rotational motion, so that a device under test can be tested utilizing a number of different linear and/or rotational input scenarios.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. An input testing tool comprising:
a frame;
a platform rotatably mounted on the frame and configured to receive a device under test for testing the device under test and to rotate during testing of the device under test;
an actuator assembly mounted on the frame and configured to removably receive one or more actuators, individual actuators being configured to test the device under test using touch and/or near touch testing scenarios,
wherein the testing tool is configured to enable the testing scenarios using at least one linear motion of the actuator assembly and at least one rotational motion of the actuator assembly.

2. The input testing tool of claim 1, wherein said at least one linear motion comprises motion in x, y, and z directions.

3. The input testing tool of claim 1 further comprising one or more actuators configured to be removably mounted on the actuator assembly.

4. The input testing tool of claim 1 further comprising one or more actuators configured to be removably, magnetically mounted on the actuator assembly.

5. The input testing tool of claim 1 further comprising one or more actuators configured to be removably mounted on the actuator assembly, individual actuators having respective tips.

6. The input testing tool of claim 1 further comprising one or more actuators configured to be removably mounted on the actuator assembly, individual actuators comprising, respectively, moveable rods extending toward and terminating at a conductive tip.

7. The input testing tool of claim 1 further comprising a pinch hanger assembly configured to be mounted on the actuator assembly and removably receive multiple actuators to enable pinch testing of the display device.

8. The input testing tool of claim 1, wherein the input testing tool is automated.

9. An input testing tool comprising:
   a frame;
   a platform rotatably mounted on the frame and configured to receive a device under test for testing a display device of the device under test and to rotate during testing of the device under test; and
   an actuator assembly mounted on the frame and configured to removably receive one or more actuators, individual actuators being configured to test a display device using touch and/or near touch testing scenarios relative to the display device, wherein the testing tool is configured to enable the testing scenarios using multiple linear motions of the actuator assembly.

10. The input testing tool of claim 9, wherein one linear motion comprises motion in the x direction, and another linear motion comprises motion in the z direction.

11. The input testing tool of claim 9, wherein one linear motion comprises motion in the y direction, and another linear motion comprises motion in the z direction.

12. The input testing tool of claim 9, wherein multiple linear motions comprise motion in the x, y, and z directions.

13. The input testing tool of claim 9 further comprising one or more actuators configured to be removably mounted on the actuator assembly.

14. The input testing tool of claim 9 further comprising one or more actuators configured to be removably, magnetically mounted on the actuator assembly.

15. The input testing tool of claim 9 further comprising one or more actuators configured to be removably mounted on the actuator assembly, individual actuators comprising a moveable rod extending toward and terminating at a tip.

16. The input testing tool of claim 9 further comprising a pinch hanger assembly configured to be mounted on the actuator assembly and removably receive multiple actuators to enable pinch testing of the display device.

17. The input testing tool of claim 9, wherein the input testing tool is automated.

18. An input testing tool comprising:
   a frame;
   a platform operably mounted on the frame and configured to receive a device under test for testing a display device of the device under test and to rotate during testing of the device under test;
   an actuator assembly mounted on the frame and configured to removably receive one or more actuators, individual actuators being configured to test a display device using touch and/or near touch testing scenarios relative to the display device;
   a plurality of actuators configured to be removably mounted on the actuator assembly;
   wherein the testing tool is configured to enable the testing scenarios using multiple rotational motions and multiple linear motions, the multiple rotational motions comprising at least rotational motion of the platform relative to the frame, and rotational motion of the actuator assembly relative to the platform;
   the linear motions comprising motion in the x, y, and z directions.

19. The input testing tool of claim 18, wherein the actuators are configured to be magnetically mounted on the actuator assembly.

20. The input testing tool of claim 18 further comprising a pinch hanger assembly configured to be mounted on the actuator assembly and removably receive multiple actuators to enable pinch testing of the display device.

* * * * *